US011127400B2

United States Patent
Song et al.

(10) Patent No.: US 11,127,400 B2
(45) Date of Patent: Sep. 21, 2021

(54) ELECTRONIC DEVICE AND METHOD OF EXECUTING FUNCTION OF ELECTRONIC DEVICE

(71) Applicant: Samsung Electronics Co., Ltd., Suwon-si (KR)

(72) Inventors: Gajin Song, Suwon-si (KR); Junghwa Kim, Suwon-si (KR); Ji-hyun Kim, Suwon-si (KR); Dongho Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/388,294

(22) Filed: Apr. 18, 2019

(65) Prior Publication Data
US 2019/0325872 A1 Oct. 24, 2019

(30) Foreign Application Priority Data
Apr. 20, 2018 (KR) .................. 10-2018-0046141

(51) Int. Cl.
*G10L 15/22* (2006.01)
*G10L 15/08* (2006.01)
*G10L 15/30* (2013.01)

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
CPC ............... G06F 3/0611; G06F 11/3051; G06F 11/3055; G10L 15/22; G10L 2015/223; G10L 15/26; G10L 2015/228; G10L 13/08; G10L 15/1815; G10L 15/183; G10L 15/005; G10L 15/20

See application file for complete search history.

(56) References Cited

U.S. PATENT DOCUMENTS

| | | | | |
|---|---|---|---|---|
| 8,977,255 | B2 * | 3/2015 | Freeman | H04M 1/72527 455/425 |
| 10,568,032 | B2 * | 2/2020 | Freeman | H04M 1/72409 |
| 2007/0135098 | A1 * | 6/2007 | Sampath | H04M 3/4938 455/412.1 |
| 2008/0248797 | A1 * | 10/2008 | Freeman | H04M 1/72403 455/425 |

(Continued)

FOREIGN PATENT DOCUMENTS

| | | |
|---|---|---|
| KR | 10-2017-0010494 A | 2/2017 |
| KR | 10-2018-0060328 A | 10/2018 |
| KR | 10-2018-0109624 A | 10/2018 |

*Primary Examiner* — Linda Wong
(74) *Attorney, Agent, or Firm* — Jefferson IP Law, LLP

(57) ABSTRACT

An electronic device and a method of the electronic device are provided. The electronic device includes a communication circuit, a microphone, a memory configured to store instructions, and at least one processor operatively connected with the communication circuit, the microphone, and the memory. Upon execution of the stored instructions, the at least one processor is configured to perform a first operation, receive an utterance through the microphone while performing the first operation, the utterance including at least one selected wake-up word used to invoke a speech-based intelligent service, determine, based on the utterance, a response related to the first operation, and output the response.

18 Claims, 17 Drawing Sheets

(56) References Cited

U.S. PATENT DOCUMENTS

| | | | |
|---|---|---|---|
| 2011/0196683 A1* | 8/2011 | Greene | G10L 15/26 |
| | | | 704/275 |
| 2015/0133109 A1* | 5/2015 | Freeman | H04W 52/0254 |
| | | | 455/420 |
| 2015/0302855 A1* | 10/2015 | Kim | G10L 15/08 |
| | | | 704/275 |
| 2016/0365101 A1* | 12/2016 | Foy | G06F 3/167 |
| 2017/0024574 A1* | 1/2017 | Agrawal | G06F 21/31 |
| 2018/0011685 A1* | 1/2018 | Weingartner | G10L 15/26 |
| 2018/0069743 A1* | 3/2018 | Bakken | G06F 16/61 |
| 2018/0190290 A1* | 7/2018 | Campbell | G06F 3/167 |
| 2019/0005955 A1* | 1/2019 | Bhattacharya | H04M 3/563 |
| 2019/0251960 A1* | 8/2019 | Maker | G10L 15/08 |
| 2019/0378493 A1* | 12/2019 | Kim | G10L 15/25 |
| 2020/0051554 A1* | 2/2020 | Kim | G10L 15/18 |

\* cited by examiner

ELECTRONIC DEVICE AND METHOD OF EXECUTING FUNCTION OF ELECTRONIC DEVICE

CROSS-REFERENCE TO RELATED APPLICATION(S)

This application is based on and claims priority under 35 U.S.C. § 119(a) of a Korean patent application number 10-2018-0046141, filed on Apr. 20, 2018, in the Korean Intellectual Property Office, the disclosure of which is incorporated by reference herein in its entirety.

BACKGROUND

1. Field

The disclosure relates to electronic devices and methods of executing the functions of the electronic devices.

2. Description of Related Art

Artificial intelligence (AI) systems are computer systems capable of implementing human-like intelligence which allows machines to self-learn, make decisions, and improve cognition as they are used more and more.

AI technology may include element techniques, such as machine learning (deep learning), which utilize algorithms capable of classifying and learning the features of entered data on their own and copying the perception or determination by the human brain using machine learning algorithms.

Such element techniques may include linguistic understanding which recognizes human languages/words, visual understanding which recognizes things as humans visually do, inference/prediction which judges information and performs logical inference and prediction, knowledge expression which processes human experience information as knowledge data, and motion control which controls robot motions and driverless vehicles.

Linguistic understanding is technology for recognizing and applying/processing a human being's language or text, and this encompasses natural language processing, machine translation, dialog system, answering inquiries, and speech recognition/synthesis.

Inference prediction is a technique of determining, logically inferring, and predicting information, encompassing knowledge/probability-based inference, optimization prediction, preference-based planning, and recommendation.

A user may input his utterance to an electronic device operating in an AI system. When the electronic device is a predetermined distance away from the user or is operating in a screen lock (hold) state, the user may have difficulty in identifying whether the operation corresponding to the utterance is being performed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method of executing a function of the electronic device for activating an intelligence system when receiving an input of an utterance (e.g., a wake-up utterance) constituted of designated words and output information about an application running on the electronic device as feedback for the utterance.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a microphone, a memory configured to store instructions, and at least one processor operatively connected with the communication circuit, the microphone, and the memory. Upon execution of the stored instructions, the at least one processor configured to perform a first operation, receive an utterance through the microphone while performing the first operation, the utterance including at least one selected wake-up word used to invoke a speech-based intelligent service, determine, based on the utterance, a response related to the first operation, and output the response.

In accordance with another aspect of the disclosure, a method of executing a function of an electronic device is provided. The method includes performing a first operation, receiving an utterance through a microphone of the electronic device while performing the first operation, determining, based on the utterance, a response related to the first operation, and outputting the response. The utterance may include only at least one selected wake-up word used to invoke a speech-based intelligent service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
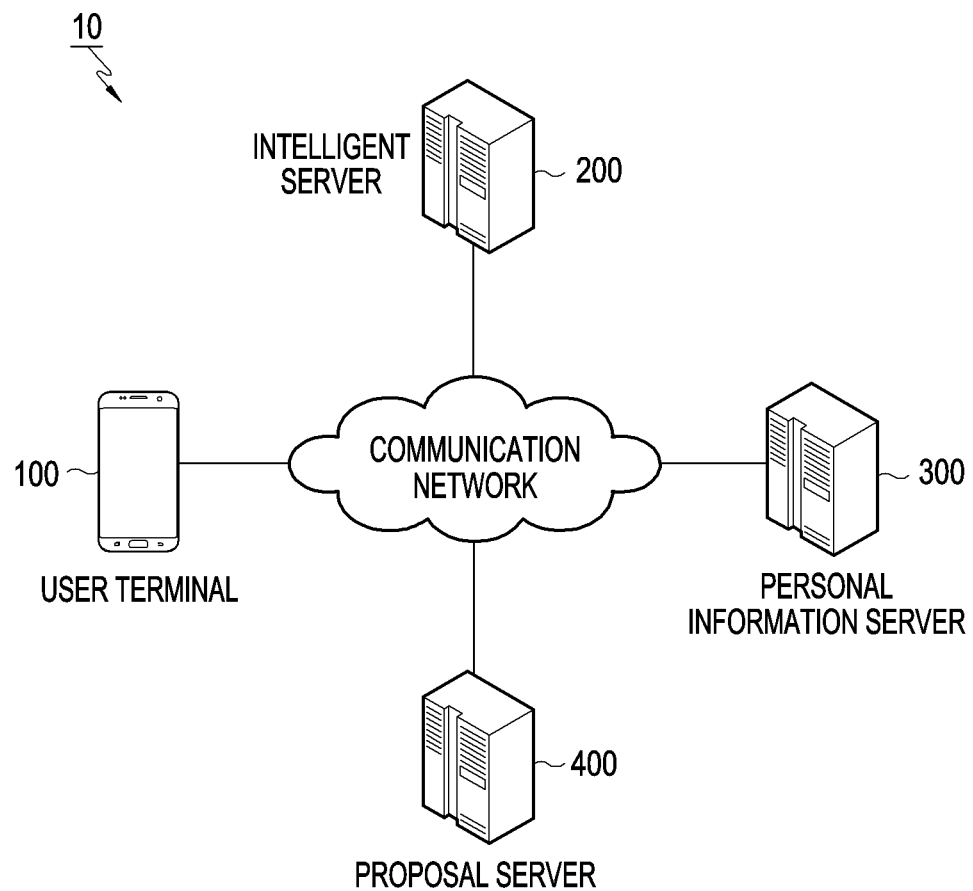
FIG. 1 is a view illustrating an integrated intelligence system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or an application processor (AP)) that may perform the operations by executing one or more software programs stored in a memory device or a dedicated processor (e.g., an embedded processor) for performing the operations.

For example, examples of the electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller machines (ATMs), point of sale (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the electronic device may be flexible or may be a combination of the above-enumerated electronic devices.

According to an embodiment of the disclosure, the electronic devices are not limited to those described above. As used herein, the term "user" may denote a human or another device (e.g., an artificially intelligent electronic device) using the electronic device.

FIG. 1 is a view illustrating an integrated intelligence system according to an embodiment of the disclosure.

Referring to FIG. 1, an integrated intelligence system 10 may include a user terminal 100, an intelligent server 200, a personal information server 300, or a proposal server 400.

The user terminal 100 may provide services necessary for the user through an app (or application program) (e.g., an alarm app, message app, photo (gallery) app, etc.) stored in the user terminal 100. For example, the user terminal 100 may execute and operate another app through an intelligent app (or speech recognition app) stored in the user terminal 100. The intelligent app of the user terminal 100 may receive user inputs to execute and operate the other app through the intelligent app. The user inputs may be received through, e.g., a physical button, touchpad, speech input, or remote input. According to an embodiment of the disclosure, the user terminal 100 may be various terminal devices (or electronic devices) connectable to the internet, such as a cellular phone, smartphone, PDA, or laptop computer.

According to an embodiment of the disclosure, the user terminal 100 may receive an utterance as a user input. The user terminal 100 may receive the utterance and generate a command to operate the app based on the utterance. Accordingly, the user terminal 100 may operate the app using the command.

The intelligent server 200 may receive the user's speech input from the user terminal 100 through a communication network and convert the speech input into text data. According to an embodiment of the disclosure, the intelligent server 200 may generate (or select) a path rule based on the text data. The path rule may include information about actions (or operations) to perform the functions of the app or information about parameters necessary to execute the operations. Further, the path rule may include the order of the operations of the app. The user terminal 100 may receive the path rule, select an app according to the path rule, and execute the operations included in the path rule on the selected app.

As used herein, the term "path rule" may generally mean a sequence of states for the electronic device to perform a task requested by the user, but not limited thereto. In other words, the path rule may contain information about a sequence. The task may be a certain action that, e.g., an intelligent app may provide. The task may include producing a schedule, transmitting a photo to a desired party, or providing weather information. The user terminal 100 may perform the task by sequentially having at least one or more states (e.g., operation states of the user terminal 100).

According to an embodiment, the path rule may be provided or created by an artificial intelligence (AI) system.

The AI system may be a rule-based system or a neural network-based system (e.g., feedforward neural network (FNN)) or recurrent neutral network (RNN)). Or, the AI system may be a combination thereof or a system different therefrom. According to an embodiment, the path rule may be selected from a set of pre-defined path rules or created in real-time in response to a user request. For example, the AI system may select at least one among a plurality of pre-defined path rules or may dynamically (or real-time) create a path rule. The user terminal 100 may use a hybrid system to provide the path rule.

According to an embodiment, the user terminal 100 may execute the operation and display, on the display, the screen corresponding to the state of the user terminal 100 having performed the operation. As another example, the user terminal 100 may execute the operation and abstain from displaying the results of performing the operation on the display. The user terminal 100 may execute, e.g., a plurality of operations and display, on the display, only some results of the plurality of operations. The user terminal 100 may display, on the display, e.g., the results of executing only the last operation in order. As another example, the user terminal 100 may receive a user input and display the results of executing the operation on the display.

The personal information server 300 may include a database storing user information. For example, the personal information server 300 may receive user information (e.g., context information or app execution) from the user terminal 100 and store the user information in the database. The intelligent server 200 may receive the user information from the personal information server 300 through the communication network and use the same in creating a path rule for user inputs. According to an embodiment of the disclosure, the user terminal 100 may receive user information from the personal information server 300 through the communication network and use the same as information for managing the database.

The proposal server 400 may include a database that stores information about functions to be provided or introductions of applications or functions in the terminal. For example, the proposal server 400 may receive user information of the user terminal 100 from the personal information server 300 and include a database for functions that the user may use. The user terminal 100 may receive information about functions to be provided from the proposal server 400 through the communication network and provide the information to the user.

Figure 2:
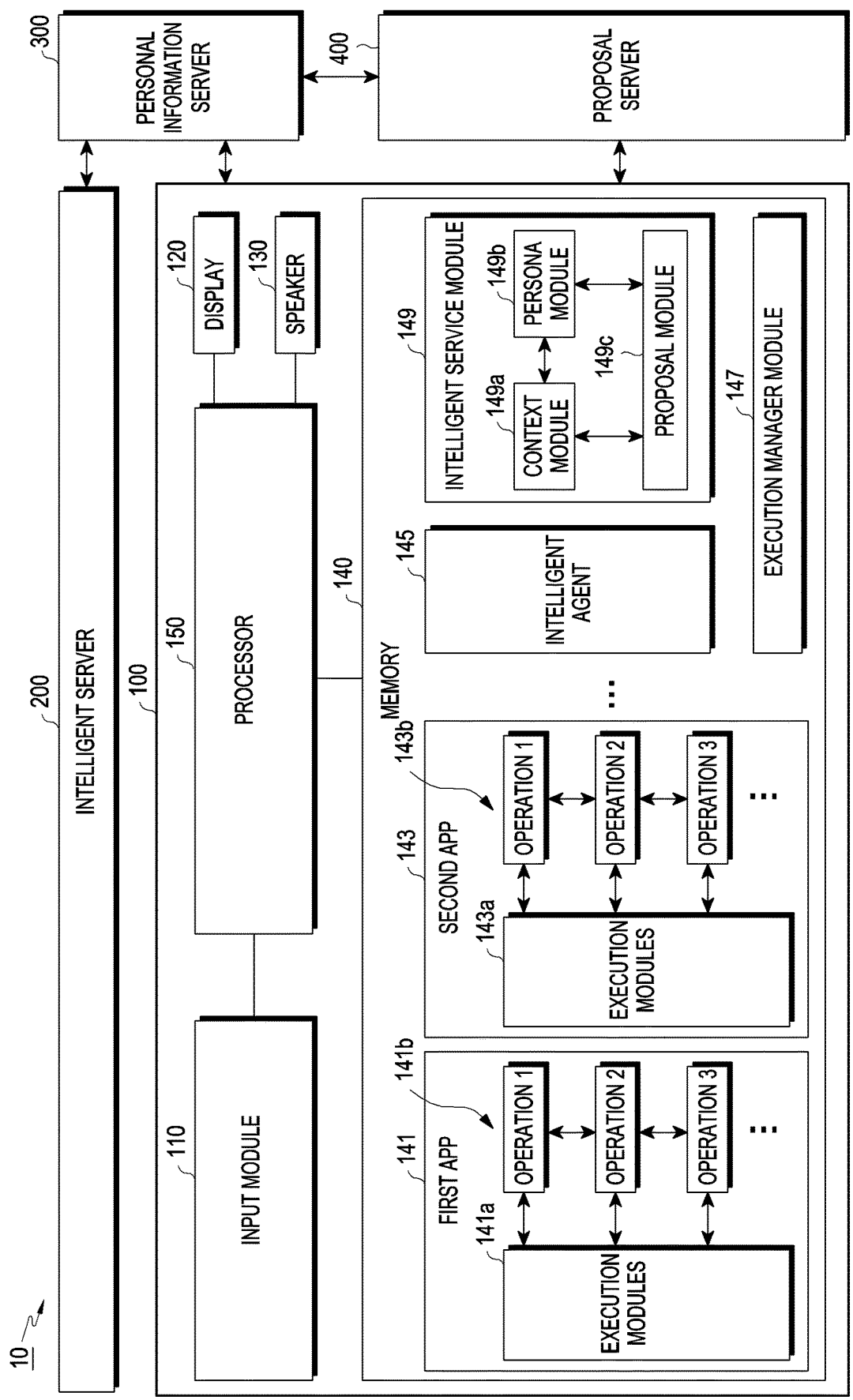
FIG. 2 is a block diagram illustrating a user terminal in an integrated intelligence system according to an embodiment of the disclosure.

FIG. 2 is a block diagram illustrating a user terminal in an integrated intelligence system according to an embodiment of the disclosure.

Referring to FIG. 2, the user terminal 100 may include an input module 110, a display 120, a speaker 130, a memory 140, and a processor 150. The user terminal 100 may further include a housing. The components of the user terminal 100 may be positioned in or on the housing. The user terminal 100 may further include a communication circuit positioned inside the housing. The user terminal 100 may transmit or receive data (or information) to/from an external server (e.g., the intelligent server 200) through the communication circuit.

According to an embodiment of the disclosure, the input module 110 may receive user inputs from the user. For example, the input module 110 may receive a user input from an external device (e.g., a keyboard or headset) connected thereto. As another example, the input module 110 may include a touchscreen combined with the display 120 (e.g., a touchscreen display). As another example, the input module 110 may include a hardware key (or a physical key) 112 positioned in the user terminal 100 (or the housing of the user terminal 100).

According to an embodiment, the input module 110 may include a microphone capable of receiving utterances as speech signals. For example, the input module 110 may include a speech input system and receive utterances as speech signals through the speech input system. The microphone may be exposed through, e.g., a portion (e.g., a first portion) of the housing.

According to an embodiment of the disclosure, the display 120 may display images, videos, and/or application execution screens. For example, the display 120 may display a graphical user interface (GUI) of the app. According to an embodiment, the display 120 may be exposed through, e.g., a portion (e.g., a second portion) of the housing.

According to an embodiment of the disclosure, the speaker 130 may output speech signals. For example, the speaker 130 may output speech signals generated from inside the user terminal 100 to the outside. According to an embodiment, the speaker 130 may be exposed through, e.g., a portion (e.g., a third portion) of the housing.

According to an embodiment of the disclosure, the memory 140 may store a plurality of apps 141 and 143. The plurality of apps 141 and 143 may be, e.g., programs for performing a function corresponding to a user input. According to an embodiment of the disclosure, the memory 140 may include the intelligent agent 145, the execution manager module 147, or the intelligent service module 149. The intelligent agent 145, the execution manager module 147, and the intelligent service module 149 may be frameworks (or application frameworks) to process received user inputs (e.g., utterances).

According to an embodiment of the disclosure, the memory 140 may include a database that may store information necessary to recognize user inputs. For example, the memory 140 may include a log database capable of storing log information. As another example, the memory 140 may include a persona database capable of storing user information.

According to an embodiment of the disclosure, the memory 140 may store the plurality of apps 141 and 143. The plurality of apps 141 and 143 may be loaded and operated. For example, the plurality of apps 141 and 143 stored in the memory 140 may be loaded and operated by the execution manager module 147. The plurality of apps 141 and 143 may include execution service modules 141a and 143a to perform functions. According to an embodiment, the plurality of apps 141 and 143 may execute a plurality of operations (e.g., a sequence of states) 141b and 143b through the execution service modules 141a and 143a to perform functions. In other words, the execution service modules 141a and 143a may be activated by the execution manager module 147 and execute the plurality of operations 141b and 143b.

According to an embodiment of the disclosure, when the operations 141b and 143b of the apps 141 and 143 are executed, the execution state screens as per the execution of the operations 141b and 143b may be displayed on the display 120. The execution state screens may be screens, e.g., in the state of the operations 141b and 143b having been completed. The execution state screens may be screens, e.g., in the state of the execution of the operations 141b and 143b having been stopped (partial landing) (e.g., when parameters required for the operations 141b and 143b are not inputted).

According to an embodiment of the disclosure, the execution service modules 141a and 143a may execute the operations 141b and 143b as per a path rule. For example, the execution service modules 141a and 143a may be activated by the execution manager module 147, receive an execution request as per the path rule from the execution manager module 147, and execute the operations 141b and 143b according to the execution request, thereby executing the functions of the apps 141 and 143. The execution service modules 141a and 143a may send completion information to the execution manager module 147 when the execution of the operations 141b and 143b is complete.

According to an embodiment of the disclosure, when the plurality of operations 141b and 143b are executed on the apps 141 and 143, the plurality of operations 141b and 143b may sequentially be executed. When the execution of one operation (e.g., operation 1 of the first app 141 or operation 1 of the second app 143) is complete, the execution service modules 141a and 143a may open the subsequent operation (e.g., operation 2 of the first app 141 or operation 2 of the second app 143) and send completion information to the execution manager module 147. Here, 'open an operation' may be appreciated as transitioning the operation into an executable state or preparing for the execution of the operation. In other words, unless the operation is open, the operation cannot be executed. Upon receiving the completion information, the execution manager module 147 may transfer an execution request for the subsequent operation (e.g., operation 2 of the first app 141 or operation 2 of the second app 143) to the execution service module. According to an embodiment of the disclosure, when the plurality of apps 141 and 143 are executed, the plurality of apps 141 and 143 may sequentially be executed. For example, when the execution of the last operation of the first app 141 (e.g., operation 3 of the first app 141) is complete, and completion information is thus received, the execution manager module 147 may send an execution request for the first operation of the second app 143 (e.g., operation 1 of the second app 143) to the execution service module 143a.

According to an embodiment of the disclosure, when the plurality of operations 141b and 143b are executed on the apps 141 and 143, the resultant screens of execution of the plurality of operations 141b and 143b may be displayed on the display 120. According to an embodiment of the disclosure, only some of the plurality of resultant screens of execution of the plurality of operations 141b and 143b may be displayed on the display 120.

According to an embodiment of the disclosure, the memory 140 may store an intelligent app (e.g., a speech recognition app) interworking with the intelligent agent 145. The app interworking with the intelligent agent 145 may receive an utterance as a speech signal and process the same. According to an embodiment of the disclosure, the app interworking with the intelligent agent 145 may be operated by particular inputs entered through the input module 110 (e.g., inputs through the hardware key or touchscreen, or particular speech inputs).

According to an embodiment of the disclosure, the intelligent agent 145, the execution manager module 147, or the intelligent service module 149 stored in the memory 140 may be executed by the processor 150. The functions of the intelligent agent 145, the execution manager module 147, or the intelligent service module 149 may be implemented by the processor 150. The functions of the intelligent agent 145, the execution manager module 147, and the intelligent service module 149 are described in connection with operations of the processor 150. According to an embodiment of the disclosure, the intelligent agent 145, the execution manager module 147, or the intelligent service module 149 stored in the memory 140 may be implemented in software or hardware.

According to an embodiment of the disclosure, the processor 150 may control the overall operation of the user terminal 100. For example, the processor 150 may control the input module 110 to receive user inputs. The processor 150 may control the display 120 to display images. The processor 150 may control the speaker 130 to output speech signals. The processor 150 may control the memory 140 to execute programs and fetch or store necessary information.

According to an embodiment of the disclosure, the processor 150 may execute the intelligent agent 145, the execution manager module 147, or the intelligent service module 149 stored in the memory 140. Thus, the processor 150 may implement the function of the intelligent agent 145, the execution manager module 147, or the intelligent service module 149.

According to an embodiment of the disclosure, the processor 150 may execute the intelligent agent 145 to generate commands to operate apps based on speech signals received as user inputs. According to an embodiment of the disclosure, the processor 150 may execute the execution manager module 147 to execute the apps 141 and 143 stored in the memory 140 as per the commands generated. According to an embodiment, the processor 150 may execute the intelligent service module 149 to manage the user information and process user inputs using the user information.

The processor 150 may execute the intelligent agent 145 to send user inputs received through the input module 110 to the intelligent server 200 and process the user inputs through the intelligent server 200.

According to an embodiment of the disclosure, the processor 150 may execute the intelligent agent 145 to pre-process the user inputs before sending the user inputs to the intelligent server 200. According to an embodiment of the disclosure, the intelligent agent 145 may include an adaptive echo canceller (AEC) module, a noise suppression (NS) module, an end-point detection (EPD) module, or an automatic gain control (AGC) module to pre-process the user inputs. The AEC module may remove echoes mixed in the user inputs. The NS module may suppress background noise mixed in the user inputs. The EPD module may detect end points of user speech contained in the user inputs to find where the user speech is present using the detected end points. The AGC module may recognize the user inputs and adjust the volume of the user inputs for a proper processing of the recognized user inputs. According to an embodiment of the disclosure, although able to execute all of the pre-processing components described above to provide a better performance, the processor 150 may alternatively execute some of the pre-processing components to be operated at reduced power.

According to an embodiment of the disclosure, the intelligent agent 145 may include a wake-up recognition module stored in the memory 140 to recognize the invocation. Thus, the processor 150 may recognize the wake-up command through the wake-up recognition module, and upon receiving the wake-up command, the processor 150 may execute the intelligent agent 145 to receive user inputs. The wake-up recognition module may be implemented in a low-power processor (e.g., a processor included in an audio codec). According to an embodiment, the processor 150 may execute the intelligent agent 145 upon receiving a user input through the hardware key. When the intelligent agent 145 is executed, an intelligent app (e.g., a speech recognition app) interworking with the intelligent agent 145 may be executed.

According to an embodiment of the disclosure, the intelligent agent 145 may include a speech recognition module to execute user inputs. The processor 150 may receive user inputs to execute operations on the app through the speech recognition module. For example, the processor 150 may recognize, through the speech recognition module, limited user (speech) inputs (e.g., the "click" sound made when the capturing operation is executed on the camera app) for executing operations, such as the wake-up command on the apps 141 and 143. The processor 150 may assist the intelligent server 200 to recognize and quickly process user commands, which are processable in the user terminal 100, through the speech recognition module. According to an embodiment, the speech recognition module of the intelligent agent 145 to execute user inputs may be implemented in an app processor.

According to an embodiment of the disclosure, the speech recognition module (including the speech recognition module of the wake-up recognition module) of the intelligent agent 145 may recognize user inputs using an algorithm for recognizing speech. The algorithm used to recognize speech may be at least one of, e.g., a hidden Markov model (HMM) algorithm, an artificial neural network (ANN) algorithm, or a dynamic time warping (DTW) algorithm.

According to an embodiment of the disclosure, the processor 150 may execute the intelligent agent 145 to convert the speech inputs into text data. For example, the processor 150 may send a user speech through the intelligent agent 145 to the intelligent server 200 and receive text data corresponding to the user speech from the intelligent server 200. Thus, the processor 150 may display the converted text data on the display 120.

According to an embodiment of the disclosure, the processor 150 may execute the intelligent agent 145 to receive a path rule from the intelligent server 200. According to an embodiment, the processor 150 may transfer the path rule to the execution manager module 147 through the intelligent agent 145.

According to an embodiment of the disclosure, the processor 150 may execute the intelligent agent 145 to transfer an execution result log as per the path rule received from the intelligent server 200 to the intelligent service module 149. The execution result log transferred may be accrued and managed in user preference information of a persona module 149b.

According to an embodiment of the disclosure, the processor 150 may execute the execution manager module 147 to receive the path rule from the intelligent agent 145, execute the apps 141 and 143, and allow the apps 141 and 143 to execute the operations 141b and 143b contained in the path rule. For example, the processor 150 may send command information (e.g., path rule information) to execute the operations 141b and 143b to the apps 141 and 143 through the execution manager module 147 and receive completion information about the operations 141b and 143b from the apps 141 and 143.

According to an embodiment of the disclosure, the processor 150 may execute the execution manager module 147 to transfer command information (e.g., path rule information) to execute the operations 141b and 143b of the apps 141 and 143 between the intelligent agent 145 and the apps 141 and 143. The processor 150 may bind the apps 141 and 143 to be executed as per the path rule through the execution manager module 147 and transfer the command information (e.g., path rule information) about the operations 141b and 143b contained in the path rule to the apps 141 and 143. For example, the processor 150 may sequentially transfer the operations 141b and 143b contained in the path rule to the apps 141 and 143 through the execution manager module 147, sequentially executing the operations 141b and 143b of the apps 141 and 143 as per the path rule.

According to an embodiment, the processor 150 may execute the execution manager module 147 to manage the execution states of the operations 141b and 143b of the apps 141 and 143. For example, the processor 150 may receive information about the execution states of the operations 141b and 143b from the apps 141 and 143 through the execution manager module 147. When the execution states of the operations 141b and 143b are, e.g., partial landing states (e.g., when no parameters required for the operations 141b and 143b are entered), the processor 150 may transfer information about the partial landing states to the intelligent agent 145 through the execution manager module 147. The processor 150 may request the user to enter necessary information (e.g., parameter information) using the information transferred through the intelligent agent 145. When the execution states of the operations 141b and 143b are other states, e.g., operation states, the processor 150 may receive an utterance from the user through the intelligent agent 145. The processor 150 may transfer information about the apps 141 and 143 being executed through the execution manager module 147 and the execution states of the apps 141 and 143 to the intelligent agent 145. The processor 150 may send the utterance through the intelligent agent 145 to the intelligent server 200. The processor 150 may receive parameter information about the utterance from the intelligent server 200 through the intelligent agent 145. The processor 150 may transfer the parameter information received through the intelligent agent 145 to the execution manager module 147. The execution manager module 147 may change the parameters of the operations 141b and 143b into new parameters using the received parameter information.

According to an embodiment, the processor 150 may execute the execution manager module 147 to transfer the parameter information contained in the path rule to the apps 141 and 143. When the plurality of apps 141 and 143 are sequentially executed as per the path rule, the execution manager module 147 may deliver the parameter information contained in the path rule from one app to the other.

According to an embodiment of the disclosure, the processor 150 may execute the execution manager module 147 to receive a plurality of path rules. The processor 150 may select a plurality of path rules based on the utterance through the execution manager module 147. For example, when a utterance specifies a certain app 141 to execute some operation 141a but does not specify another app 143 to execute the other operation 143b, the processor 150 may, through the execution manager module 147, receive a plurality of different path rules by which the same app 141 (e.g., a gallery app) to execute the operation 141a is executed and a different app 143 (e.g., a message app or a telegram app) to execute the other operation 143b is executed. The processor 150 may execute the same operations 141b and 143b (e.g., the same continuous operations 141b and 143b) of the plurality of path rules through the execution manager module 147. When the same operations have been executed, the processor 150 may, through the execution manager module 147, display, on the display 120, the state screen where the different apps 141 and 143 each contained in a respective one of the plurality of path rules may be selected.

According to an embodiment of the disclosure, the intelligent service module 149 may include a context module 149a, a persona module 149b, or a proposal module 149c.

The processor 150 may execute the context module 149a to identify current states of the apps 141 and 143 from the apps 141 and 143. For example, the processor 150 may execute the context module 149a to receive context information indicating the current states of the apps 141 and 143 to identify the current states of the apps 141 and 143 through the received context information.

The processor 150 may execute the persona module 149b to manage the personal information about the user using of the user terminal 100. For example, the processor 150 may execute the persona module 149b to identify use information and execution results of the user terminal 100 and manage the user's personal information using the identified use information and execution results of the user terminal 100.

The processor 150 may execute the proposal module 149c to predict the user's intention and recommend a command for the user based on the user's intention. For example, the processor 150 may execute the proposal module 149c to recommend a command for the user given the user's current state (e.g., time, place, context, or app).

According to an embodiment, a system 10 comprises a first electronic device (e.g., the user terminal 100) including a communication circuit, an input module 110 (e.g., a microphone and a speaker), at least one processor (e.g., the processor 150) being part of the first electronic device or configured to remotely communicate with the first electronic device, and a memory 140 positioned on or outside the first electronic device and operatively connected with the at least one processor, wherein the memory may store instructions executed to enable the at least one processor to configured to perform a first operation, receive a utterance through the microphone while performing the first operation, the utterance including only at least one selected wake-up word used to invoke a speech-based intelligent service, identify a response related to the first operation, and provide the response through the speaker.

According to an embodiment, the first electronic device may include a first processor among the at least one processor. The system may further comprise a server including a second processor among the at least one processor.

According to an embodiment, the instructions may be configured to enable the first processor to perform the first operation, after receiving the utterance, transmit data related to the first operation to the server, receive the response from the server, and output a speech response through the speaker based on at least part of the response.

According to an embodiment, the instructions may be configured to enable the second processor to receive data related to the utterance from the first electronic device, generate or select a response related to the first operation, and transmit the response to the first electronic device.

According to an embodiment, the first operation may include a call event, an alarm event, a timer event, music play, video play, a hands-free event, or a content downloading event.

According to an embodiment, information included in the response may include information about the first operation, information about a progress of the first operation, or information about an operation subsequent to the first operation.

According to an embodiment, the instructions may be configured to enable the at least one processor to identify progress information varied or added within a designated time after generating the response, and further output a first response including the identified progress information through the speaker.

According to an embodiment, the instructions may be configured to enable the first processor to receive a user input for the response, identify a second operation related to the first operation when the received user input corresponds to a designated input, and further output a second response to identify whether to perform the second operation.

According to an embodiment, the instructions may be configured to enable the first processor to receive a user input for the response and when the received user input does not correspond to a designated input, perform at least one function corresponding to the first operation.

According to an embodiment, the instructions may be configured to enable the first processor to transmit data related to the first operation to the server when no additional utterance is received within a designated time after the utterance is received.

According to an embodiment, the instructions may be configured to enable the at least one processor to identify whether the first electronic device is operated in a designated mode and, after receiving the utterance, transmit data related to the first operation to the server. For example, the designated mode may include a mode (eyes-free mode) in which the user terminal 100 recognizes the user's biometric information and the user does not look at the user terminal 100 or is a designated distance away or a hold mode in which the screen (e.g., the display device 160) of the user terminal 100 is turned off as no user input is identified for a designated time.

Figure 3:
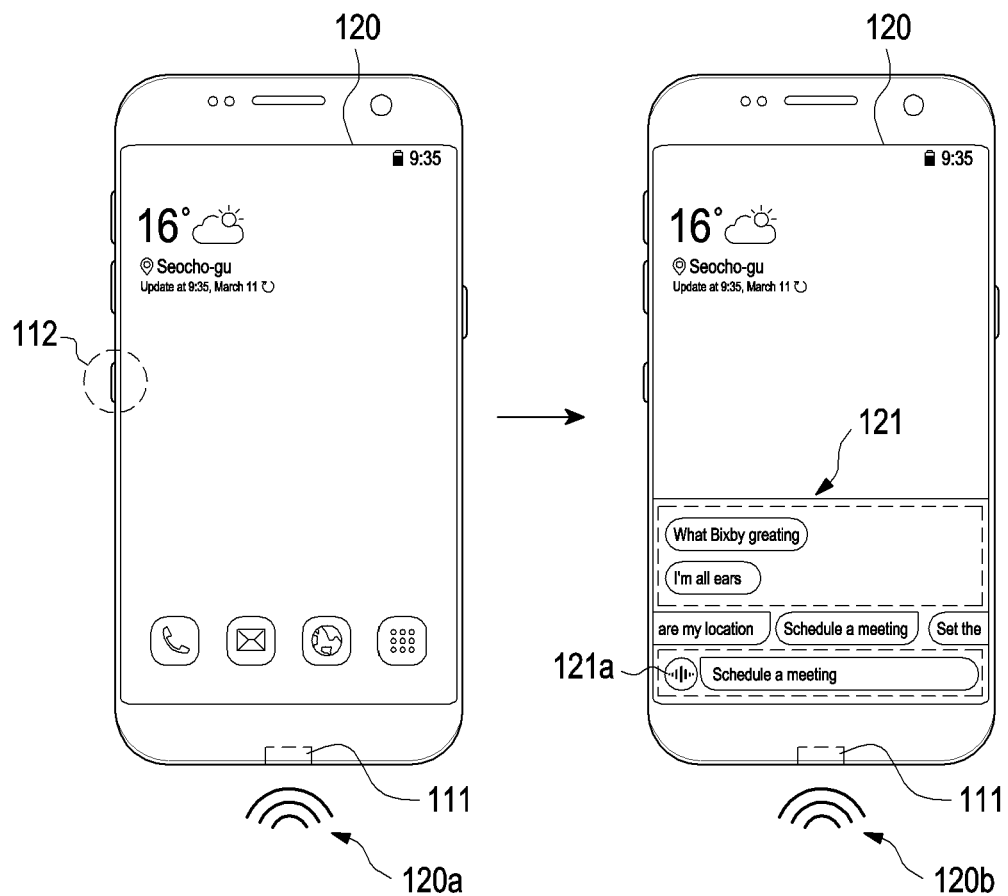
FIG. 3 is a view illustrating an example of executing an intelligent app on a user terminal according to an embodiment of the disclosure.

FIG. 3 is a view illustrating an example of executing an intelligent app on a user terminal according to an embodiment of the disclosure.

FIG. 3 illustrates an example in which the user terminal 100 receives user inputs and executes an intelligent app (e.g., a speech recognition app) interworking with the intelligent agent 145.

Referring to FIG. 3, according to an embodiment of the disclosure, the user terminal 100 may execute an intelligent app to recognize speech through the hardware key 112. For example, when the user terminal 100 receives user inputs through the hardware key 112, the user terminal 100 may display a user interface (UI) 121 of the intelligent app on the display 120. The user may touch a speech recognition button 121a in the UI 121 of the intelligent app for speech entry 120b with the intelligent app UI 121 displayed on the display 120. As another example, the user may continuously press the hardware key 112 for speech entry 120b.

According to an embodiment of the disclosure, the user terminal 100 may execute an intelligent app to recognize speech through the microphone 111. For example, when a designated speech (e.g., "wake up!") is entered (120a) through the microphone 111, the user terminal 100 may display the intelligent app UI 121 on the display 120.

Figure 4:
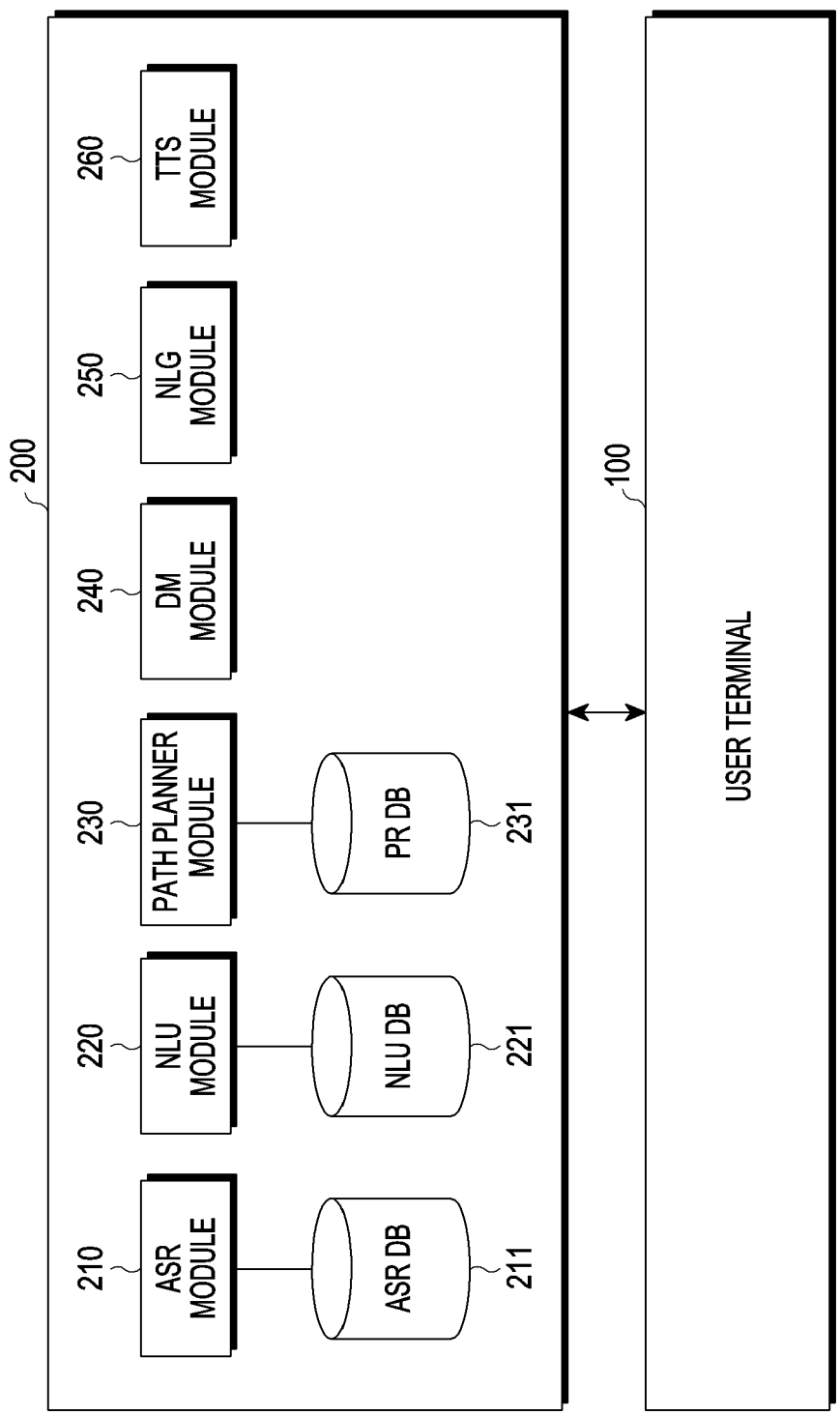
FIG. 4 is a block diagram illustrating an intelligent server in an integrated intelligence system according to an embodiment of the disclosure.

FIG. 4 is a block diagram illustrating an intelligent server in an integrated intelligence system according to an embodiment of the disclosure.

Referring to FIG. 4, an intelligent server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to an embodiment, the intelligent server 200 may include a communication circuit, a memory, and a processor. The processor may execute commands stored in the memory to drive the ASR module 210, the NLU module 220, the path planner module 230, the DM module 240, the NLG module 250, and the TTS module 260. The intelligent server 200 may transmit or receive data (or information) to/from an external electronic device (e.g., the user terminal 100) through the communication circuit.

The NLU module 220 or the path planner module 230 of the intelligent server 200 may generate a path rule.

According to an embodiment of the disclosure, the ASR module 210 may convert user inputs received from the user terminal 100 into text data.

According to an embodiment of the disclosure, the ASR module 210 may convert user inputs received from the user terminal 100 into text data. For example, the ASR module 210 may include a speech recognition module. The speech recognition module may include an acoustic model and a language model. For example, the acoustic model may include vocalization-related information, and the language model may include unit phonemic information and combinations of pieces of unit phonemic information. The speech recognition module may convert utterances into text data using the vocalization-related information and unit phonemic information. Information about the acoustic model and the language model may be stored in, e.g., an ASR database (DB) 211.

According to an embodiment of the disclosure, the NLU module 220 may perform syntactic analysis or semantic analysis to identify the user's intent. As per the syntactic analysis, the user input may be divided into syntactic units (e.g., words, phrases, or morphemes) and what syntactic elements the syntactic units have may be identified. The semantic analysis may be performed using, e.g., semantic matching, rule matching, or formula matching. Thus, the NLU module 220 may obtain a domain, intent, or parameters (or slots) necessary to represent the intent for the user input.

According to an embodiment of the disclosure, the NLU module 220 may determine the user's intent and parameters using the matching rule which has been divided into the domain, intent, and parameters (or slots) necessary to identify the intent. For example, one domain (e.g., an alarm) may include a plurality of intents (e.g., alarm settings or releasing alarm), and one intent may include a plurality of parameters (e.g., time, repetition count, or alarm sound). The plurality of rules may include, e.g., one or more essential element parameters. The matching rule may be stored in an NLU database (DB) 221.

According to an embodiment of the disclosure, the NLU module 220 may identify the meaning of a word extracted from the user input using linguistic features (e.g., syntactic elements) such as morphemes or phrases, match the identified meaning of the word to the domain and intent, and determine the user's intent. For example, the NLU module 220 may calculate how many words extracted from the user input are included in each domain and intent to thereby determine the user's intent. According to an embodiment of the disclosure, the NLU module 220 may determine the parameters of the user input using the word which is a basis for identifying the intent. According to an embodiment of the disclosure, the NLU module 220 may determine the user's intent using the NLU DB 221 storing the linguistic features for identifying the intent of the user input. According to an embodiment of the disclosure, the NLU module 220 may determine the user's intent using a personal language model (PLM). For example, the NLU module 220 may determine the user's intent using personal information (e.g., contacts list or music list). The PLM may be stored in, e.g., the NLU DB 221. According to an embodiment of the disclosure, the ASR module 210, but not the NLU module 220 alone, may recognize the user's speech by referring to the PLM stored in the NLU DB 221.

According to an embodiment of the disclosure, the NLU module 220 may generate a path rule based on the intent of the user input and parameters. For example, the NLU module 220 may select an app to be executed based on the intent of the user input and determine operations to be performed on the selected app. The NLU module 220 may determine parameters corresponding to the determined operations to generate a path rule. According to an embodiment of the disclosure, the path rule generated by the NLU module 220 may include information about the app to be executed, operations (e.g., at least one or more states) to be executed on the app, and the parameters necessary to execute the operations.

According to an embodiment of the disclosure, the NLU module 220 may generate one or more path rules based on the parameters and intent of the user input. For example, the NLU module 220 may receive a path rule set corresponding to the user terminal 100 from the path planner module 230, map the parameters and intent of the user input to the received path rule set, and determine the path rule.

According to an embodiment of the disclosure, the NLU module 220 may determine the app to be executed, operations to be executed on the app, and parameters necessary to execute the operations based on the parameters and intent of the user input, thereby generating one or more path rules. For example, the NLU module 220 may generate a path rule by arranging the app to be executed and the operations to be executed on the app in the form of ontology or a graph model according to the user input using the information of the user terminal 100. The generated path rule may be stored through, e.g., the path planner module 230 in a path rule database (PR DB) 231. The generated path rule may be added to the path rule set of the PR DB 231.

According to an embodiment of the disclosure, the NLU module 220 may select at least one of a plurality of path rules generated. For example, the NLU module 220 may select the optimal one of the plurality of path rules. As another example, the NLU module 220 may select a plurality of path rules when only some operations are specified based on the utterance. The NLU module 220 may determine one of the plurality of path rules by the user's additional input.

According to an embodiment of the disclosure, the NLU module 220 may send the path rule to the user terminal 100 at a request for the user input. For example, the NLU module 220 may send one path rule corresponding to the user input to the user terminal 100. As another example, the NLU module 220 may send a plurality of path rules corresponding to the user input to the user terminal 100. For example, when only some operations are specified based on the utterance, the plurality of path rules may be generated by the NLU module 220.

According to an embodiment of the disclosure, the path planner module 230 may select at least one of the plurality of path rules.

According to an embodiment of the disclosure, the path planner module 230 may deliver a path rule set including the plurality of path rules to the NLU module 220. The plurality of path rules in the path rule set may be stored in the form of a table in the PR DB 231 connected with the path planner module 230. For example, the path planner module 230 may deliver a path rule set corresponding to information (e.g., operating system (OS) information or app information) of the user terminal 100 which is received from the intelligent agent 145 to the NLU module 220. The table stored in the PR DB 231 may be stored, e.g., per domain or per domain version.

According to an embodiment of the disclosure, the path planner module 230 may select one or more path rules from the path rule set and deliver the same to the NLU module 220. For example, the path planner module 230 may match the user's intent and parameters to the path rule set corresponding to the user terminal 100 to select one or more path rules and deliver them to the NLU module 220.

According to an embodiment of the disclosure, the path planner module 230 may generate one or more path rules using the user's intent and parameters. For example, the path planner module 230 may determine an app to be executed and operations to be executed on the app based on the user's intent and parameters to generate one or more path rules. According to an embodiment of the disclosure, the path planner module 230 may store the generated path rule in the PR DB 231.

According to an embodiment of the disclosure, the path planner module 230 may store the path rule generated by the NLU module 220 in the PR DB 231. The generated path rule may be added to the path rule set stored in the PR DB 231.

According to an embodiment of the disclosure, the table stored in the PR DB 231 may include a plurality of path rules or a plurality of path rule sets. The plurality of path rule or the plurality of path rule sets may reflect the kind, version, type, or characteristic of the device performing each path rule.

According to an embodiment of the disclosure, the DM module 240 may determine whether the user's intent identified by the path planner module 230 is clear. For example, the DM module 240 may determine whether the user's intent is clear based on whether parameter information is sufficient. The DM module 240 may determine whether the parameters identified by the NLU module 220 are sufficient to perform a task. According to an embodiment of the disclosure, when the user's intent is unclear, the DM module 240 may perform feedback to send a request for necessary information to the user. For example, the DM module 240 may perform feedback to send a request for parameter information to identify the user's intent.

According to an embodiment of the disclosure, the DM module 240 may include a content provider module. When the operation can be performed based on the intent and parameters identified by the NLU module 220, the content provider module may generate the results of performing the task corresponding to the user input. According to an embodiment of the disclosure, the DM module 240 may send the results generated by the content provider module to the user terminal 100 in response to the user input.

According to an embodiment of the disclosure, the NLG module 250 may convert designated information into text. The text information may be in the form of a natural language utterance. The designated information may be, e.g., information about an additional input, information indicating that the operation corresponding to the user input is complete, or information indicating the user's additional input (e.g., feedback information for the user input). The text information may be sent to the user terminal 100 and displayed on the display 120, or the text information may be sent to the TTS module 260 and converted into a speech.

According to an embodiment of the disclosure, the TTS module 260 may convert text information into speech information. The TTS module 260 may receive the text information from the NLG module 250, convert the text information into speech information, and send the speech information to the user terminal 100. The user terminal 100 may output the speech information through the speaker 130.

According to an embodiment of the disclosure, the NLU module 220, the path planner module 230, and the DM module 240 may be implemented in a single module. For example, the NLU module 220, the path planner module 230, and the DM module 240 may be implemented in a single module to determine the user's intent and parameters and to generate a response (e.g., a path rule) corresponding to the user's intent and parameters determined. Accordingly, the generated response may be transmitted to the user terminal 100.

Figure 5:
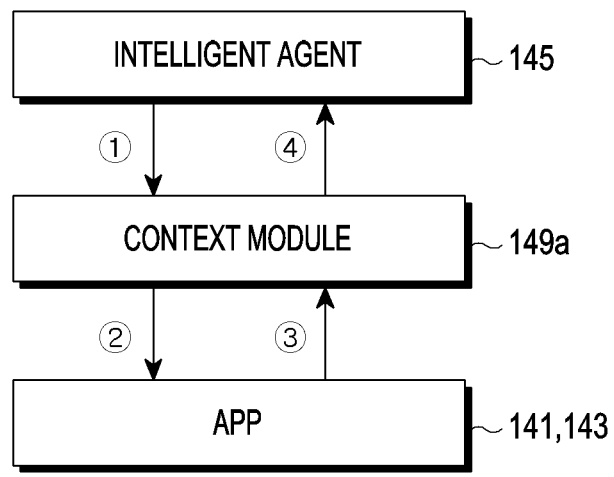
FIG. 5 is a view illustrating an example of identifying current states by a context module of an intelligent service module according to an embodiment of the disclosure.

FIG. 5 is a view illustrating an example of identifying current states by a context module of an intelligent service module according to an embodiment of the disclosure.

Referring to FIG. 5, upon receiving (1) a context request from the intelligent agent 145, the processor 150 may send a request (2) for context information indicating the current states to the apps 141 and 143 via the context module 149*a*. According to an embodiment of the disclosure, the processor 150 may, through the context module 149*a*, receive (3) the context information from the apps 141 and 143 and send (4) to the intelligent agent 145.

According to an embodiment, the processor 150 may receive a plurality of context information from the apps 141 and 143 via the context module 149*a*. The context information may be, e.g., information about the apps 141 and 143 executed latest. As another example, the context information may be information about the current states of the apps 141 and 143 (e.g., in the case a photo is viewed in a gallery, information about the photo).

According to an embodiment of the disclosure, the processor 150 may, through the context module 149*a*, receive the context information indicating the current state of the user terminal 100 not only from the apps 141 and 143 but also from a device platform. The context information may include normal context information, user context information, or device context information.

The normal context information may include normal information about the user terminal 100. The normal context information may be identified by receiving data through, e.g., a sensor hub of the device platform, and by an internal algorithm. For example, the normal context information may include information about the current time/space. The information about the current time/space may include information about, e.g., the current time or the current position of the user terminal 100. The current time may be identified by the clock of the user terminal 100, and the information about the current position may be identified by the global positioning system (GPS). As another example, the normal context information may include information about physical motion. The information about physical motion may include information about, e.g., walking, running, or driving. The physical motion information may be identified by a motion sensor. The driving information may be identified by the motion sensor, and a Bluetooth connection in the vehicle may be detected so that getting aboard and parking may be identified. As another example, the normal context information may include user activity information. The user activity information may include information about, e.g., commuting, shopping, or traveling. The user activity information may be identified using information about the place which has been registered in the database by the user or app.

The user context information may include information about the user. For example, the user context information may include information about the user's emotional state. The emotional state information may include information about, e.g., the user's happiness, sadness, or anger. As another example, the user context information may include information about the user's current state. The current state information may include information about, e.g., interest or intent (e.g., shopping).

The device context information may include information about the state of the user terminal 100. For example, the device context information may include information about the path rule executed by the execution manager module 147. As another example, the device information may include battery information. The battery information may be identified through, e.g., the charged or discharged state of the battery. As another example, the device information may include information about the network or a connected device. The information about the connected device may be identified through the communication interface connected with the device.

Figure 6:
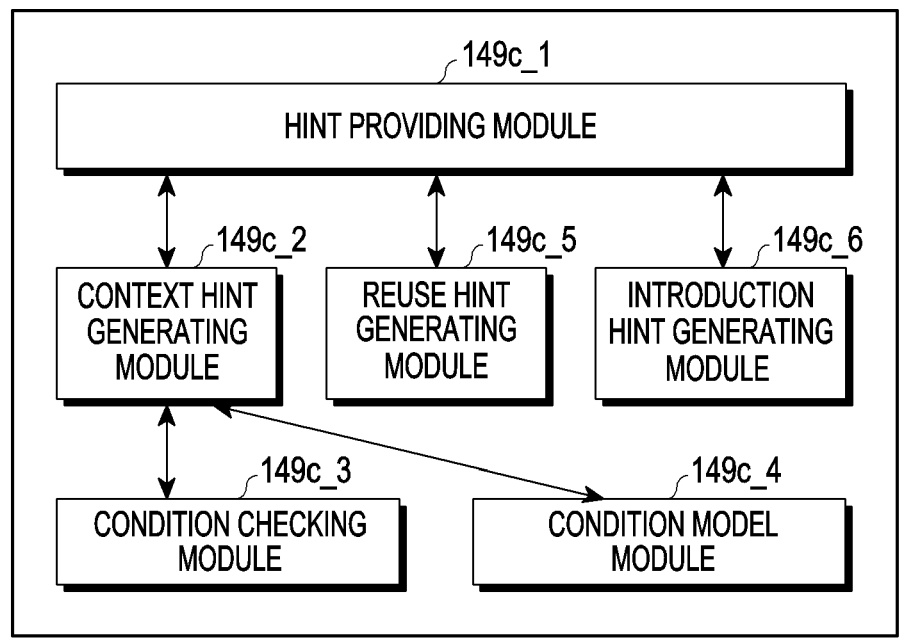
FIG. 6 is a block diagram illustrating a proposal module of an intelligent service module according to an embodiment of the disclosure.

FIG. 6 is a block diagram illustrating a proposal module of an intelligent service module according to an embodiment of the disclosure.

Referring to FIG. 6, the proposal module 149*c* may include a hint providing module 149*c*_1, a context hint generating module 149*c*_2, a condition checking module 149*c*_3, condition model module 149*c*_4, a reuse hint generating module 149*c*_5, or an introduction hint generating module 149*c*_6.

According to an embodiment of the disclosure, the processor 150 may execute the hint providing module 149*c*_1 which may provide hints to the user. For example, the processor 150 may, through the hint providing module 149*c*_1, receive generated hints from the context hint generating module 149*c*_2, the reuse hint generating module 149*c*_5, or introduction hint generating module 149*c*_6 and provide the hints to the user.

According to an embodiment of the disclosure, the processor 150 may execute the condition checking module 149*c*_3 or the condition model module 149*c*_4 to generate hits recommendable as per the current state. The processor 150 may execute the condition checking module 149*c*_3 to receive information corresponding to the current state and execute the condition model module 149*c*_4 to set a condition model using the received information. For example, the processor 150 may execute the condition model module 149*c*_4 to identify, e.g., the time, location, context, or app being used, when the hints are provided to the user, and provide the user with the hints highly likely to be used in descending order of priority.

According to an embodiment of the disclosure, the processor 150 may execute the reuse hint generating module 149*c*_5 to generate hints as per the use frequency. For example, the processor 150 may execute the reuse hint generating module 149*c*_5 to generate hints based on the user's use pattern.

According to an embodiment of the disclosure, the introduction hint generating module 149*c*_6 may generate hints to introduce the user to new functions or functions that other users frequently use. For example, a hint to introduce new functions may include an introduction to the intelligent agent 145 (e.g., a method to operate).

According to an embodiment of the disclosure, the context hint generating module 149*c*_2, condition checking module 149*c*_3, condition model module 149*c*_4, reuse hint generating module 149*c*_5, or introduction hint generating module 149*c*_6 of the proposal module 149*c* may be included in the personal information server 300. For example, the processor 150 may, through the hint providing module 149*c*_1 of the proposal module 149*c*, receive hints from the context hint generating module 149c_2, reuse hint generating module 149c_5, or introduction hint generating module 149c_6 of the personal information server 300 and provide the received hints to the user.

According to an embodiment of the disclosure, the user terminal 100 may provide hints according to a series of processes as follows. For example, upon receiving a provide hint request from the intelligent agent 145, the processor 150 may transfer a generate hint request to the context hint generating module 149c_2 through the hint providing module 149c_1. Upon receiving the generate hint request, the processor 150 may, through the condition checking module 149c_3, receive information corresponding to the current state from the context module 149a and persona module 149b. The processor 150 may transfer the received information to the condition model module 149c_4 through the condition checking module 149c_3 and may, the condition model module 149c_4, assign priorities to the hints provided to the user in descending order of availability using the information. The processor 150 may, through the context hint generating module 149c_2, identify (6) the condition and generate hints corresponding to the current state. The processor 150 may transfer the generated hints to the hint providing module 149c_1 through the context hint generating module 149c_2. The processor 150 may, through the hint providing module 149c_1, sort the hints as per a designated rule and transfer the hints to the intelligent agent 145.

According to an embodiment of the disclosure, the processor 150 may, through the hint providing module 149c_1, generate a plurality of context hints and assign priorities to the plurality of context hints as per a designated rule. According to an embodiment of the disclosure, the processor 150 may, through the hint providing module 149c_1, first provide the user with the higher-priority ones among the plurality of context hints.

According to an embodiment of the disclosure, the user terminal 100 may propose hints as per use frequency. For example, upon receiving a provide hint request from the intelligent agent 145, the processor 150 may transfer a generate hint request to the reuse hint generating module 149c_5 through the hint providing module 149c_1. Upon receiving the generate hint request, the processor 150 may, through the reuse hint generating module 149c_5, receive user information from the persona module 149b. For example, the processor 150 may, through the reuse hint generating module 149c_5, receive the path rule included in the user's preference information, parameters included in the path rule, frequency of execution of app, and information about the time/space where the app has been used, from the persona module 149b. The processor 150 may generate hints corresponding to the received user information through the reuse hint generating module 149c_5. The processor 150 may transfer the generated hints to the hint providing module 149c_1 through the reuse hint generating module 149c_5. The processor 150 may, through the hint providing module 149c_1, sort the hints and transfer the hints to the intelligent agent 145.

According to an embodiment of the disclosure, the user terminal 100 may propose hints for new functions. For example, upon receiving a provide hint request from the intelligent agent 145, the processor 150 may transfer a generate hint request to the introduction hint generating module 149c_6 through the hint providing module 149c_1. The processor 150 may, through the introduction hint generating module 149c_6, transfer a provide introduction hint request from a proposal server 400 and receive information about functions to be introduced from the proposal server 400. For example, the proposal server 400 may store the information about the functions to be introduced. A hint list for the functions to be introduced may be updated by the service operator. The processor 150 may transfer the generated hints to the hint providing module 149c_1 through the introduction hint generating module 149c_6. The processor 150 may, through the hint providing module 149c_1, sort the hints and transmit (6) the hints to the intelligent agent 145.

Accordingly, the processor 150 may provide hints generated by the context hint generating module 149c_2, reuse hint generating module 149c_5, or introduction hint generating module 149c_6 to the user through the proposal module 149c. For example, the processor 150 may, through the proposal module 149c, display the generated hints on the app that operates the intelligent agent 145 and receive inputs to select the hints from the user through the app.

Figure 7:
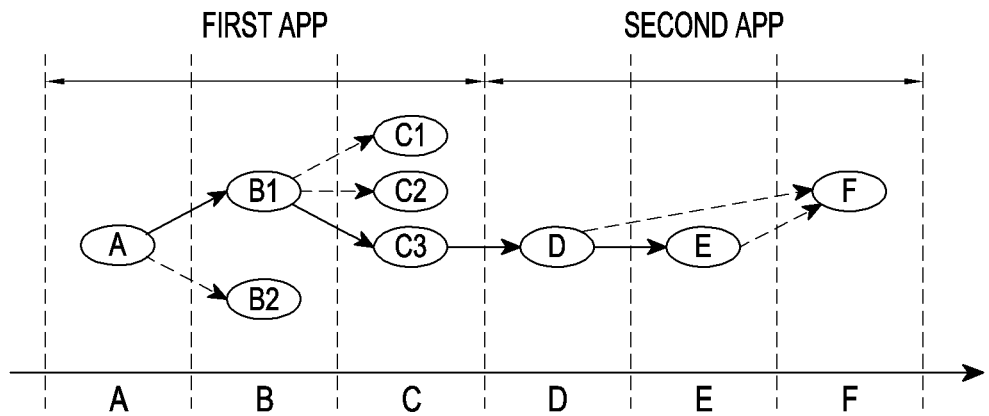
FIG. 7 is a view illustrating a method for generating a path rule by a path planner module according to an embodiment of the disclosure.

FIG. 7 is a view illustrating a method for generating a path rule by a path planner module according to an embodiment of the disclosure.

Referring to FIG. 7, according to an embodiment of the disclosure, the NLU module 220 may sort functions of an app into any one operation (e.g., state A to state F) and store in the PR DB 231. For example, the NLU module 220 may store a path rule set including a plurality of path rules A-B1-C1, A-B1-C2, A-B1-C3-D-F, and A-B1-C3-D-E-F divided into any one operation in the PR DB 231.

According to an embodiment of the disclosure, the PR DB 231 of the path planner module 230 may store the path rule set to perform the functions of the app. The path rule set may include a plurality of path rules including the plurality of operations (e.g., a sequence of states). In the plurality of path rules, the operations executed as per the parameters each inputted to a respective one of the plurality of operations may sequentially be arranged. According to an embodiment of the disclosure, the plurality of path rules may be configured in the form of ontology or a graph model and stored in the PR DB 231.

According to an embodiment of the disclosure, the NLU module 220 may select the optimal one A-B1-C3-D-F of the plurality of path rules A-B1-C1, A-B1-C2, A-B1-C3-D-F, and A-B1-C3-D-E-F corresponding to the parameters and the intent of the user input.

According to an embodiment of the disclosure, the NLU module 220 may deliver the plurality of path rules to the user terminal 100 unless there is a path rule perfectly matching the user input. For example, the NLU module 220 may select the path rule (e.g., A-B1) partially corresponding to the user input. The NLU module 220 may select one or more path rules (e.g., A-B1-C1, A-B1-C2, A-B1-C3-D-F, A-B1-C3-D-E-F) including the path rule (e.g., A-B1) partially corresponding to the user input and deliver the same to the user terminal 100.

According to an embodiment of the disclosure, the NLU module 220 may select one of the plurality of path rules based on an additional input of the user terminal 100 and deliver the selected path rule to the user terminal 100. For example, the NLU module 220 may select one (e.g., A-B1-C3-D-F) among the plurality of path rules (e.g., A-B1-C1, A-B1-C2, A-B1-C3-D-F, A-B1-C3-D-E-F) as per an additional user input (e.g., an input to select C3) of the user terminal 100 and send the selected path rule to the user terminal 100.

According to an embodiment of the disclosure, the NLU module 220 may determine the user's intent and parameters corresponding to the additional user input (e.g., an input to select C3) to the user terminal 100 through the NLU module 220 and send the user's intent or parameters determined to the user terminal 100. The user terminal 100 may select one (e.g., A-B1-C3-D-F) among the plurality of path rules (e.g., A-B1-C1, A-B1-C2, A-B1-C3-D-F, A-B1-C3-D-E-F) based on the parameters or intent sent.

Accordingly, the user terminal 100 may complete the operations of the apps 141 and 143 by the selected path rule.

According to an embodiment of the disclosure, when a user input having insufficient information is received by the intelligent server 200, the NLU module 220 may generate a path rule partially corresponding to the received user input. For example, the NLU module 220 may send the partially corresponding path rule to the intelligent agent 145. The processor 150 may execute the intelligent agent 145 to receive the path rule and transfer the partially corresponding path rule to the execution manager module 147. The processor 150 may execute a first app 141 as per the path rule through the execution manager module 147. The processor 150 may, through the execution manager module 147, send information about the insufficient parameters to the intelligent agent 145 while executing the first app 141. The processor 150 may, through the intelligent agent 145, send a request for additional input to the user using the information about the insufficient parameters. Upon receiving an additional input from the user, the processor 150 may, through the intelligent agent 145, send the same to the intelligent server 200 for processing. The NLU module 220 may generate an added path rule based on the parameter information and intent of the additional user input and send the path rule to the intelligent agent 145. The processor 150 may, through the intelligent agent 145, send the path rule to the execution manager module 147 to execute a second app 143.

According to an embodiment of the disclosure, when a user input having some missing information is received by the intelligent server 200, the NLU module 220 may send a request for user information to the personal information server 300. The personal information server 300 may send, to the NLU module 220, information about the user who has entered the user input stored in the persona database. The NLU module 220 may select a path rule corresponding to the user input having some missing operations using the user information. Accordingly, although a user input having some missing information is received by the intelligent server 200, the NLU module 220 may send a request for the missing information and receive an additional input, or the NLU module 220 may use the user information, determining a path rule corresponding to the user input.

Table 1 below may represent an example path rule related to tasks requested by the user according to an embodiment.

TABLE 1

| Path rule ID | State | parameter |
| --- | --- | --- |
| Gallery_101 | pictureView(25) | NULL |
|  | searchView(26) | NULL |
|  | searchViewResult(27) | Location, time |
|  | SearchEmptySelectedView(28) | NULL |
|  | SearchSelectedView(29) | ContentType, selectall |
|  | CrossShare(30) | Anaphora |

Referring to Table 1, a path rule generated or selected by an intelligent server (e.g., the intelligent server 200 of FIG. 1) according to an utterance (e.g., "Share photos") may include at least one state 25, 26, 27, 28, 29, or 30. For example, the at least one state (e.g., any one operation state of the terminal) may correspond to at least one of executing a photo application (PicturesView) 25, executing a photo search function (SearchView) 26, outputting a search result display screen (SearchViewResult) 27, outputting a search result display screen with no photo selected (SearchEmptySelectedView) 28, outputting a search result display screen with at least one photo selected (SearchSelectedView) 29, or outputting a shared application selection screen (CrossShare) 30.

According to an embodiment, the path rule parameter information may correspond to at least one state. For example, it may be included in the state 29 of outputting a search result display screen with at least one photo selected.

As a result of performing the path rule including the sequence of states 25, 26, 27, 28, 29, or 30, the task (e.g., "Share photos!") requested by the user may be performed.

Figure 8:
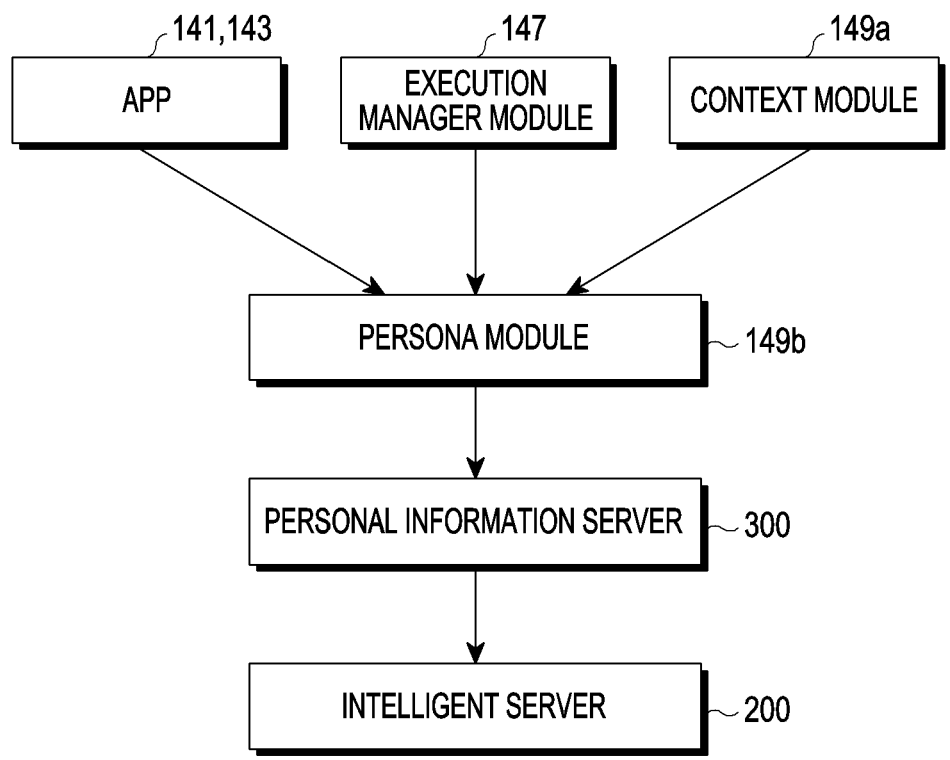
FIG. 8 is a view illustrating an example of managing user information by a persona module of an intelligent service module according to an embodiment of the disclosure.

FIG. 8 is a view illustrating an example of managing user information by a persona module of an intelligent service module according to an embodiment of the disclosure.

Referring to FIG. 8, the processor 150 may receive information about the user terminal 100 from the apps 141 and 143, execution manager module 147, or the context module 149a through the persona module 149b. The processor 150 may, through the apps 141 and 143 and the execution manager module 147, store resultant information of execution of the app operations 141b and 143b in the operation log database. The processor 150 may, through the context module 149a, store information about the current state of the user terminal 100 in the context database. The processor 150 may, through the persona module 149b, receive the stored information from the operation log database or the context database. The data stored in the operation log database and the context database may be analyzed by, e.g., an analysis engine, and transferred to the persona module 149b.

According to an embodiment of the disclosure, the processor 150 may, through the persona module 149b, send the information received from the apps 141 and 143, the execution manager module 147, or the context module 149a to the proposal module 149c. For example, the processor 150 may, through the persona module 149b, transfer the data stored in the operation log database or context database to the proposal module 149c.

According to an embodiment of the disclosure, the processor 150 may, through the persona module 149b, send the information received from the apps 141 and 143, the execution manager module 147, or the context module 149a to the personal information server 300. For example, the processor 150 may, through the persona module 149b, periodically send the data accrued in the operation log database or context database to the personal information server 300.

According to an embodiment, the processor 150 may, through the persona module 149b, transfer the data stored in the operation log database or context database to the proposal module 149c. User information generated by the persona module 149b may be stored in a persona database. The persona module 149b may periodically send user information stored in the persona database to the personal information server 300. According to an embodiment of the disclosure, the information sent by the persona module 149b to the personal information server 300 may be stored in the persona database. The personal information server 300 may infer user information necessary to generate a path rule of the intelligent server 200 using the information stored in the persona database.

According to an embodiment of the disclosure, the user information inferred using the information sent from the persona module 149b may include profile information or preference information. The profile information or the preference information may be inferred through the user's account and accrued information.

The profile information may include the user's personal information. The profile information may include, e.g., the user's population statistics information. The population statistics information may include, e.g., the user's gender or age. As another example, the profile information may include life event information. The life event information may be inferred by comparing log information with a life event model, and reinforced by analyzing the behavior pattern. As another example, the profile information may include interest information. The interest information may include, e.g., shopping goods of interest or field of interest (e.g., sports or politics). For example, the profile information may include activity region information. The activity region information may include information about, e.g., a home or workplace. The activity region information may include not only information about place or location but also information about regions recorded with priorities based on the accrued time of stay and visit count. For example, the profile information may include activity time information. The activity time information may include information about, e.g., wake-up time, commute time, or sleep time. The commute time information may be inferred using the activity region information (e.g., information about a home or workplace). The sleep time information may be inferred through unused time of the user terminal 100.

The preference information may include information about the user's preference. For example, the preference information may include information about an app preference. The app preference may be inferred through, e.g., record of use of an app (e.g., use record per time or place). The app preference may be used to determine an app to be executed as per the user's current state (e.g., time or place). For example, the preference information may include information about contacts preference. The contacts preference may be inferred by analyzing, e.g., information about how frequent one has contact with another, e.g., per time or place. The contacts preference may be used to determine contacts as per the user's current state (e.g., contact to overlapping names). As another example, the preference information may include setting information. The setting information may be inferred by, e.g., analyzing how frequent particular settings are made, e.g., per time or place. The setting information may be used to make particular settings as per the user's current state (e.g., time, place, or context). For example, the preference information may include place preference. The place preference may be inferred through, e.g., a record of visits to a particular place (e.g., a record of visit per time). The place preference may be used to determine the place that the user is visiting as per the user's current state (e.g., time). For example, the preference information may include command preference. The command preference may be inferred through, e.g., frequency of use of commands (e.g., use frequency per time or place). The command preference may be used to determine a command pattern to be used as per the user's current state (e.g., time or place). In particular, the command preference may include information about the menu chosen mostly by the user in the current state of the app executed through analysis of log information.

Figure 9:
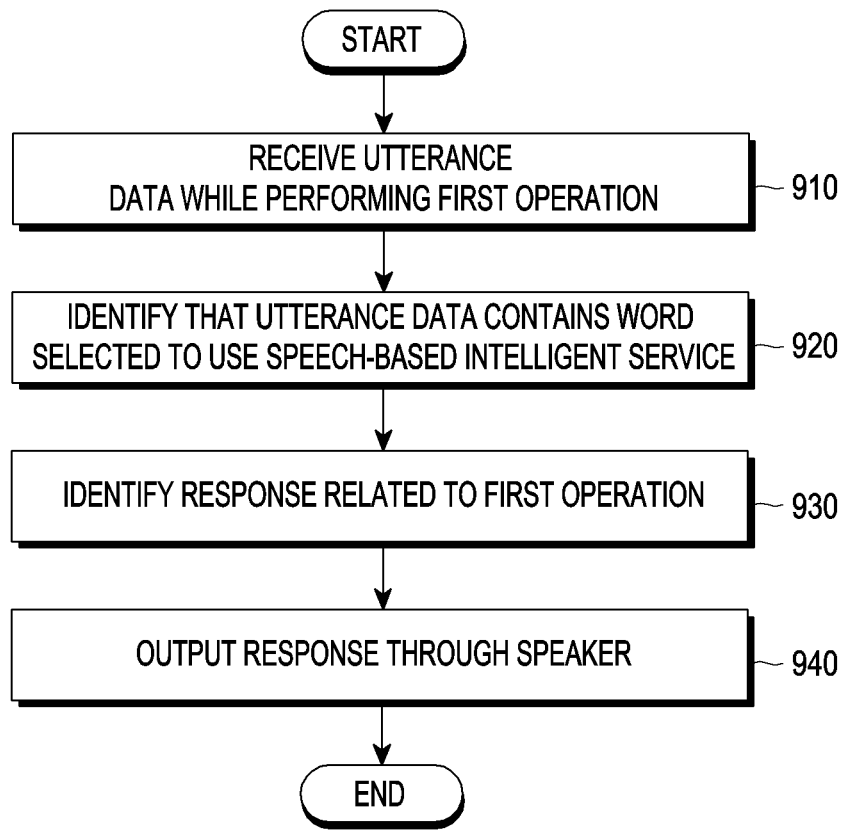
FIG. 9 is a flowchart illustrating an example operation of executing a function of an electronic device in an intelligence system according to an embodiment of the disclosure.

FIG. 9 is a flowchart illustrating an example operation of executing a function of an electronic device in an intelligence system according to an embodiment of the disclosure.

Referring to FIG. 9, according to an embodiment, an electronic device (e.g., the user terminal 100) may receive an utterance while performing a first operation in operation 910. For example, the first operation may include a call event, an alarm event, a timer event, music play, video play, a hands-free event, or a content downloading event.

According to an embodiment, the electronic device may identify that the utterance includes a word selected to use a speech-based intelligent service in operation 920. For example, the utterance may be a wake-up utterance used to invoke a speech-based intelligent service and may only include at least one selected wake-up word.

According to an embodiment, the electronic device may identify a response related to the first operation in operation 930. For example, information contained in the response may include information about the first operation, information about the progress of the first operation, or information about an operation subsequent to the first operation.

According to an embodiment, the electronic device may output the response through the speaker in operation 940. For example, the response may include the information about the first operation or the information about the progress of the first operation, which is contained in the response, or information inquiring whether to perform the subsequent operation.

According to an embodiment, a method of executing a function of an electronic device in an intelligence system comprises performing at least one operation, receiving an utterance through a microphone of the electronic device while performing the at least one operation, generating or selecting a response related to the first operation, and providing the response through a speaker, wherein the utterance may include only at least one selected wake-up word used to invoke a speech-based intelligent service.

According to an embodiment, the method may further comprise transmitting data related to the utterance to a server and receiving, from the server, a response generated in relation with the at least one operation.

According to an embodiment, the method may further comprise identifying progress information varied or added within a designated time after generating the response and further outputting a first response including the identified progress information through the speaker.

According to an embodiment, the method may further comprise receiving a user input for the response, identifying a second operation related to the first operation when the received user input corresponds to a designated input, and further outputting a second response to identify whether to perform the second operation.

According to an embodiment, the method may further comprise receiving a user input for the response and when the received user input does not correspond to a designated input, performing at least one function corresponding to the first operation.

According to an embodiment, the method may further comprise transmitting data related to the first operation to the server when no additional utterance is received within a designated time after the utterance is received.

According to an embodiment, the method may further comprise identifying whether the electronic device is operated in a designated mode and, after receiving the utterance, transmitting data related to the first operation to the server.

Figure 10:
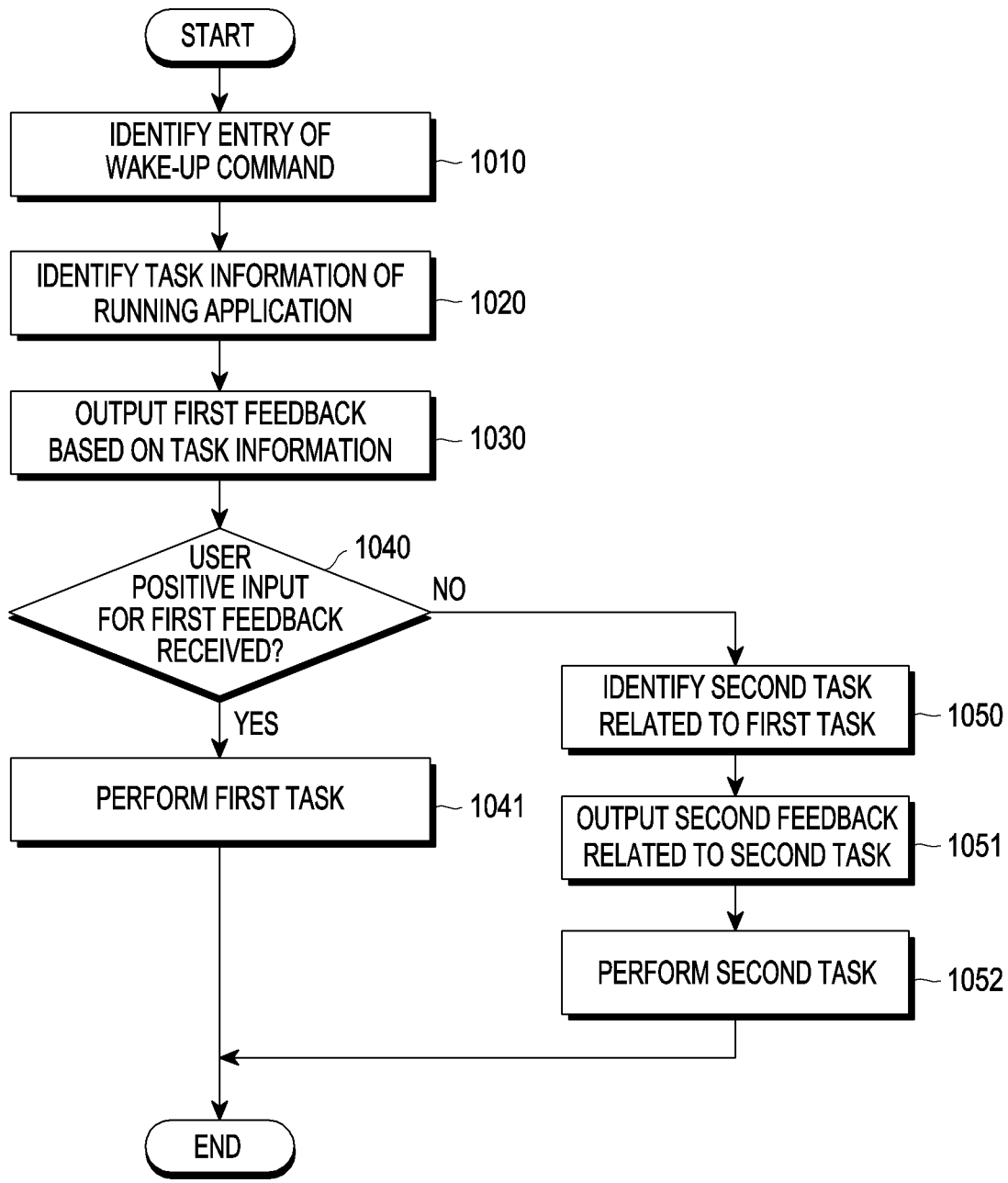
FIG. 10 is a flowchart illustrating an example operation of executing a function of an electronic device in an intelligence system according to an embodiment of the disclosure.

FIG. 10 is a flowchart illustrating an example operation of executing a function of an electronic device in an intelligence system according to an embodiment of the disclosure.

Referring to FIG. 10, according to an embodiment, an electronic device (e.g., the user terminal 100) may identify entry of a wake-up command (e.g., a wake-up utterance or hardware key entry) from the user in operation 1010. For example, the wake-up utterance may be constituted of designated words (e.g., "Bixby!").

According to an embodiment, the electronic device may identify that a wake-up command is entered by identifying selection of a designated button (e.g., a hardware key 112) of the electronic device or a button of an external electronic device (e.g., a wired or wireless earphone) wired or wirelessly connected with the electronic device.

According to an embodiment, the electronic device may identify task information about an application running on the electronic device in operation 1020. For example, the task information may include information related to an operation that may be provided from the running application.

According to an embodiment, the electronic device may output a first feedback for the utterance based on the task information in operation 1030. For example, the first feedback may include information about an operation being executed or an event generated from the application or information inquiring whether to perform a first task that may be performed as an operation subsequent to the operation being executed or the event.

According to an embodiment, when the electronic device receives a call, the electronic device may identify an operation of taking the call as the first task.

According to an embodiment, the electronic device may determine whether a positive input for the first feedback is received in operation 1040. For example, the input for the first feedback may include a positive or negative response as to whether to perform the first task. According to an embodiment, unless the input is received within a designated time, the electronic device may identify it as a negative response.

According to an embodiment, when a positive response to the first feedback is received as a result of performing operation 1040 described above, the electronic device may perform the first task in operation 1041.

According to an embodiment, when a negative response to the first feedback is received as a result of performing operation 1040 described above, the electronic device may identify a second task related to the first task in operation 1050. For example, the second task may include information related to an operation performed as an operation subsequent to the first task on the application.

According to an embodiment, the second task may be an operation of transmitting a message to the other party whose call has been rejected, as an operation performable as an operation subsequent to the first task. For example, according to reception of a negative response for the first task, the electronic device may determine that the user may not receive the call and identify the second task as an operation of transmitting, to the other party, a message containing information (e.g., "Cannot take a call.") indicating that the user may not receive the call.

According to an embodiment, the electronic device may output a second feedback related to the second task in operation 1051. For example, the second feedback may include information (e.g., "Message will be transmitted to the other party.") about an operation performed on the electronic device as the second task is performed.

According to an embodiment, the electronic device may perform the second task in operation 1052. For example, unless a response is received within a designated time after the second feedback is output, the electronic device may identify it as receiving a positive response for the second feedback and perform the second task.

Figure 11:
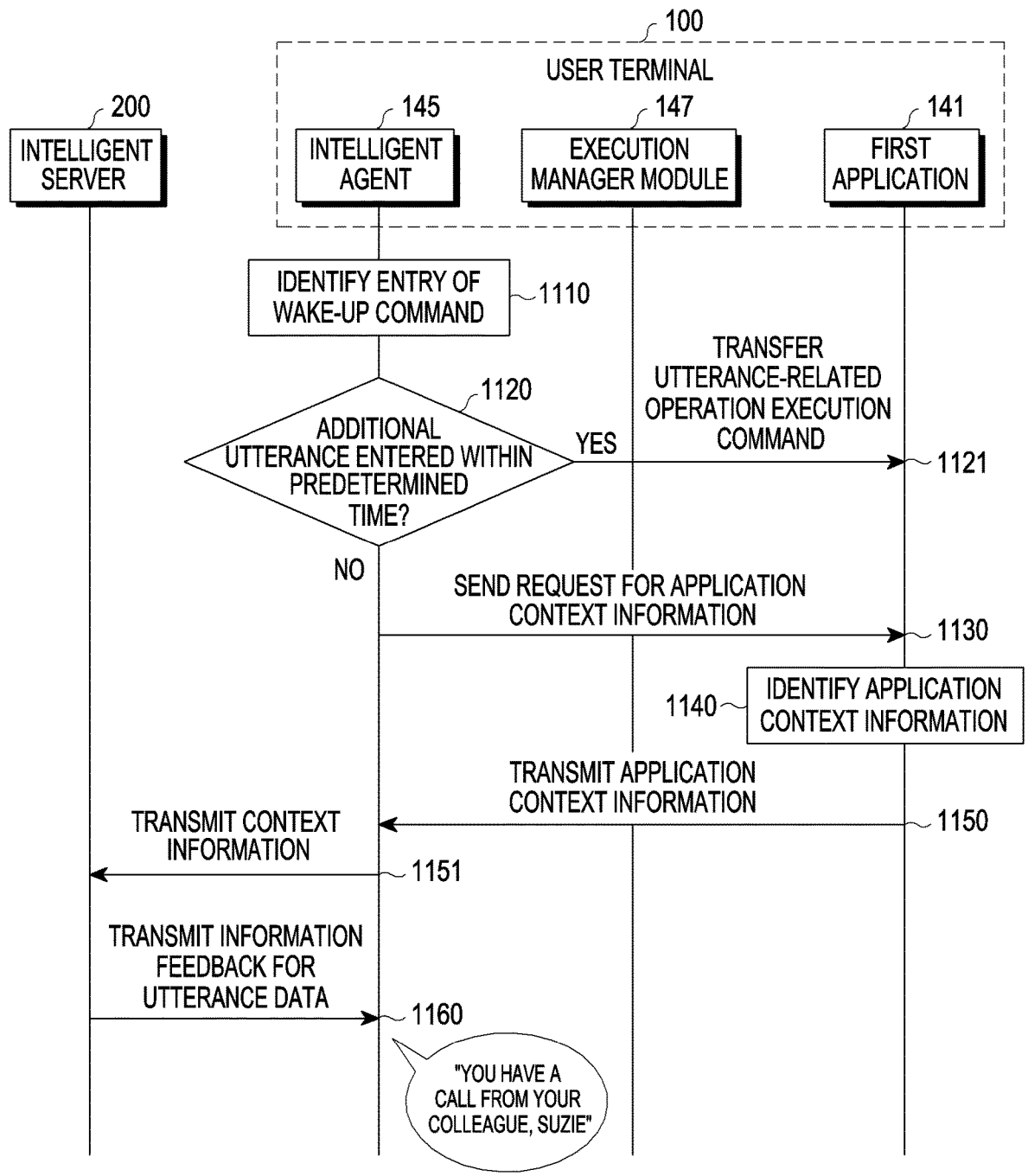
FIG. 11 is a flowchart illustrating an example operation between a server and an electronic device in an intelligence system according to an embodiment of the disclosure.

FIG. 11 is a flowchart illustrating an example operation between a server and an electronic device in an intelligence system according to an embodiment of the disclosure.

Referring to FIG. 11, an intelligence system may include an intelligent server 200 and a user terminal 100.

According to an embodiment, an intelligent agent 145 of a user terminal 100 may identify entry of a wake-up command (e.g., a wake-up utterance) in operation 1110. For example, the wake-up utterance may be constituted of designated words (e.g., "Bixby!").

According to an embodiment, the electronic device may identify that the wake-up utterance is entered by identifying selection of a designated button (e.g., the hardware key 112 of FIG. 3) of the electronic device or a button of an external electronic device (e.g., a cover or wired or wireless earphone) wired or wirelessly connected with the electronic device.

According to an embodiment, the intelligent agent 145 may determine whether an additional utterance is entered within a predetermined time after the utterance has been entered in operation 1120. When an additional utterance is determined to be entered, an execution manager module 147 of a user terminal 100 may deliver an operation execution command related to the utterance to an application to execute an operation of the application related to the utterance in operation 1121.

According to an embodiment, when no additional utterance is determined to be entered as a result of operation 1120, the intelligent agent 145 may send a request for application context information to a first application 141 in operation 1130.

According to an embodiment, the first application 141 may identify context information about an event generated from the first application 141 in operation 1140. For example, the context information may include information related to a call event from 'Suzie,' who is a 'colleague', as the call event is generated.

According to an embodiment, the first application 141 may transmit the context information of the application to the intelligent agent 145 in operation 1150.

According to an embodiment, the intelligent agent 145 may transmit the context information to the intelligent server 200 in operation 1151.

According to an embodiment, the intelligent server 200 may transmit an information feedback for the utterance to the intelligent agent 145 in operation 1160.

According to an embodiment, the intelligent agent 145 may perform control to allow the transmitted feedback to be output through an input/output device of the user terminal 100. For example, the feedback may contain the content "You have a call from your colleague, Suzie," as information indicating that a call is received from Suzie who is a colleague.

Figure 12:
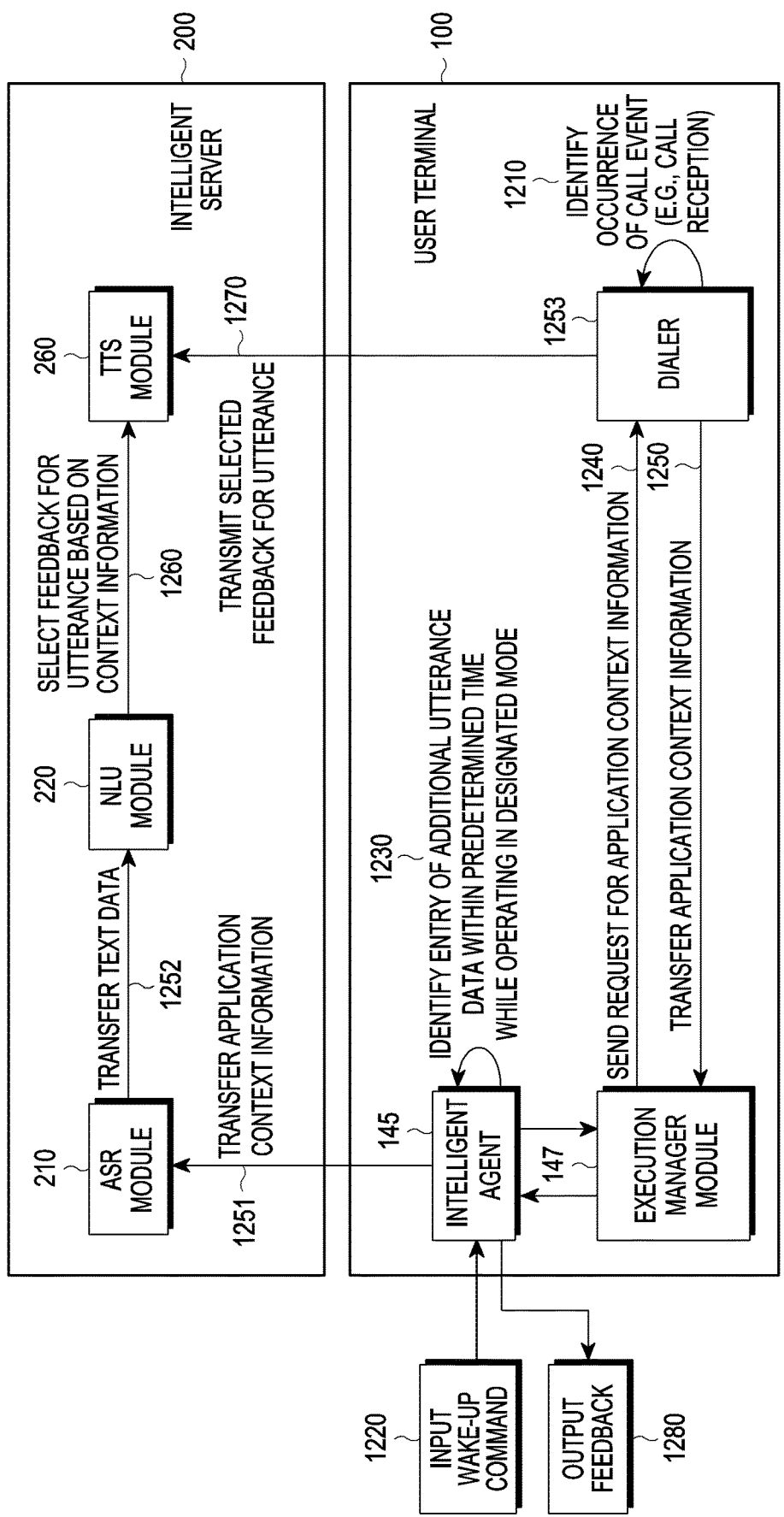
FIG. 12 is a block diagram illustrating example components of an intelligence system and example operations among the components according to an embodiment of the disclosure.

FIG. 12 is a block diagram illustrating example components of an intelligence system and example operations among the components according to an embodiment of the disclosure.

Referring to FIG. 12, an intelligence system may include an intelligent server 200 and a user terminal 100. The intelligent server 200 may include an ASR module 210, an NLU module 220, and a TTS module 260, and the user terminal 100 may include an intelligent agent 145, an execution manager module 147, and a phone application (e.g., a dialer 1253).

According to an embodiment, the dialer 1253 may identify that a call event occurs in operation 1210. For example, when the call event occurs, the dialer 1253 may output a ringtone and caller information in various types of data, such as a speech, image, or text data, thereby indicating that the call is received.

According to an embodiment, the intelligent agent 145 may identify entry of a wake-up command (or wake-up utterance) from the user while the call event occurs in operation 1220. For example, the wake-up utterance may be constituted of designated words and may be a speech command to activate an intelligent service.

According to an embodiment, the intelligent agent 145 may determine whether an additional utterance is entered within a predetermined time after the wake-up utterance has been entered in operation 1230. For example, when an additional utterance is entered within the designated time, an operation of an application of the user terminal 100 corresponding to the additional utterance may be performed.

According to an embodiment, upon determining that no additional utterance is entered within the designated time, the intelligent agent 145 may control the execution manager module 147 to send a request for context information about a phone application to the dialer 1253 in operation 1240.

According to an embodiment, the dialer 1253 may identify the context information of the phone application and transfer to the execution manager module 147 in operation 1250.

According to an embodiment, the intelligent agent 145 may transfer the context information to the ASR module 210 of the intelligent server 200 in operation 1251.

According to an embodiment, the ASR module 210 of the intelligent server 200 may convert the utterance into text data and transfer the text data to the NLU module 220 in operation 1252.

According to an embodiment, the NLU module 220 may select feedback for the utterance based on the context information in operation 1260. For example, depending on whether a subsequent task or progress information is identified in relation to the call event, the NLU module 220 may identify information to be contained in the feedback for the utterance among various pieces of information.

According to an embodiment, the intelligent server 200 may transmit the selected feedback via the TTS module 260 to the user terminal 100 in operation 1270.

According to an embodiment, the intelligent agent 145 may output feedback for the utterance in operation 1280.

Figure 13:
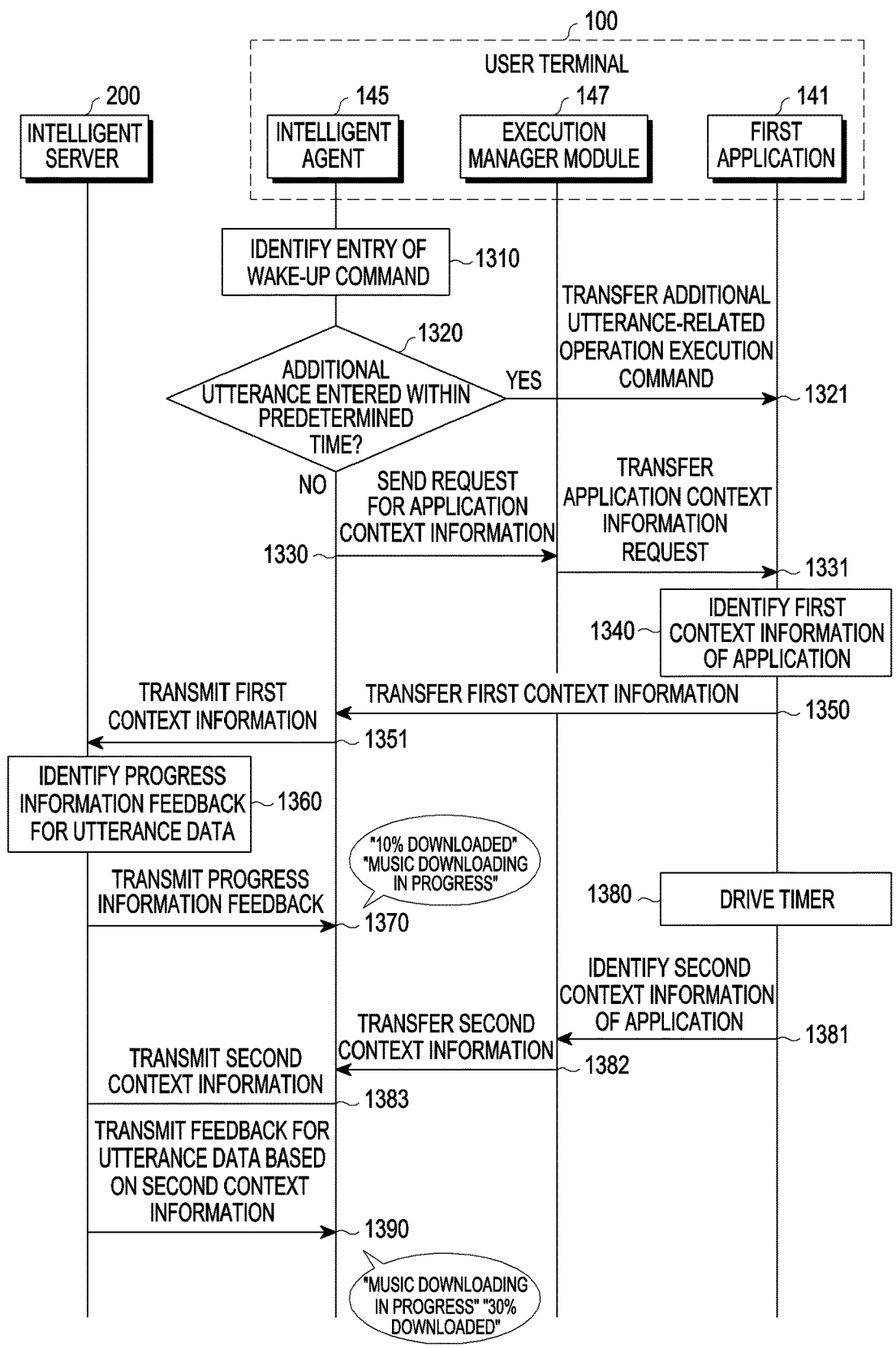
FIG. 13 is a flowchart illustrating an example operation between a server and an electronic device in an intelligence system according to an embodiment of the disclosure.

FIG. 13 is a flowchart illustrating an example operation between a server and an electronic device in an intelligence system according to an embodiment of the disclosure.

Referring to FIG. 13, an intelligence system may include an intelligent server 200 and a user terminal 100. The user terminal 100 may include an intelligent agent 145 and a first application 141.

According to an embodiment, the user terminal 100 may identify that an event occurs through the first application 141. For example, the first application 141 may be an application for playing content and may identify an occurrence of an event of downloading a content file to be played.

According to an embodiment, the intelligent agent 145 of the user terminal 100 may identify entry of a wake-up command (e.g., a wake-up utterance) while the event occurs in operation 1310. For example, the wake-up utterance may be constituted of designated words (e.g., "Bixby!").

According to an embodiment, the intelligent agent 145 may identify that the wake-up utterance is entered by identifying selection of a designated button (e.g., the hardware key 112) of the user terminal 100 or a button of an external electronic device (e.g., a wired or wireless earphone) wired or wirelessly connected with the user terminal 100.

According to an embodiment, the intelligent agent 145 may determine whether an additional utterance is entered within a predetermined time after the utterance has been entered in operation 1320.

According to an embodiment, when an additional utterance is determined to be entered with the predetermined time in operation 1320, the intelligent agent 145 may transfer a command for executing an operation related to the additional utterance to the first application 141 in operation 1321. For example, although it is shown that the intelligent agent 145 transfers the command for executing the operation related to the additional utterance to the first application 141, when the additional utterance indicates an operation of an application different from the first application 141, the intelligent agent 145 may perform control to allow the operation execution command to be transferred to the application.

According to an embodiment, when no additional utterance is determined to be entered within the predetermined time in operation 1320, the intelligent agent 145 may send a request for context information of the first application 141 to the execution manager module 147 in operation 1330.

According to an embodiment, the execution manager module 147 may transfer the context information request to the first application 141 in operation 1331.

According to an embodiment, the first application 141 may identify context information related to the occurring event in operation 1340.

According to an embodiment, the first application 141 may transfer first context information related to the occurring event to the intelligent agent 145 in operation 1350.

According to an embodiment, the intelligent agent 145 may transmit the first context information to the intelligent server 200 in operation 1351.

According to an embodiment, the intelligent server 200 may identify feedback for utterance based on the transmitted application context information in operation 1360. For example, the feedback may include content information and content download progress information as information about the event.

According to an embodiment, the intelligent server 200 may transmit the identified feedback to the intelligent agent 145 in operation 1370.

According to an embodiment, the intelligent agent 145 may output the feedback in various forms through the input/output device 340 (e.g., a speaker or display) of the user terminal 100. For example, the feedback may include the content "(content) 10% downloaded" as event progress information or "music being downloaded" as event information.

According to an embodiment, the first application 141 may drive a timer in operation 1380. For example, the first application 141 may drive the timer to determine whether second context information added or varied is identified within a predetermined time.

According to an embodiment, upon identifying the second context information before the timer expires, the first application 141 may transfer the second context information to the execution manager module 147 in operation 1381.

According to an embodiment, the execution manager module 147 may transfer the second context information to the intelligent agent 145 in operation 1382.

According to an embodiment, the intelligent agent 145 may transfer the second context information to the intelligent server 200 in operation 1383.

According to an embodiment, the intelligent server 200 may identify an additional feedback for the utterance based on the identified second context information and transmit it to the intelligent agent 145 in operation 1390. For example, the intelligent agent 145 may output the additional feedback through the input/output device 340. The additional feedback may include the content "(content) 30% downloaded" as information indicating the varied content download has progressed.

According to an embodiment, when an utterance is entered while an event for an application occurs, the user terminal 100 may output, as feedback, information indicating the progress of the event in relation to the utterance. Additionally, as the progress varies, the information indicating the varied progress may be output as an additional feedback. For example, the user may receive, through the intelligence system, the progress information about the event occurring for the application and the varied progress information.

Figure 14:
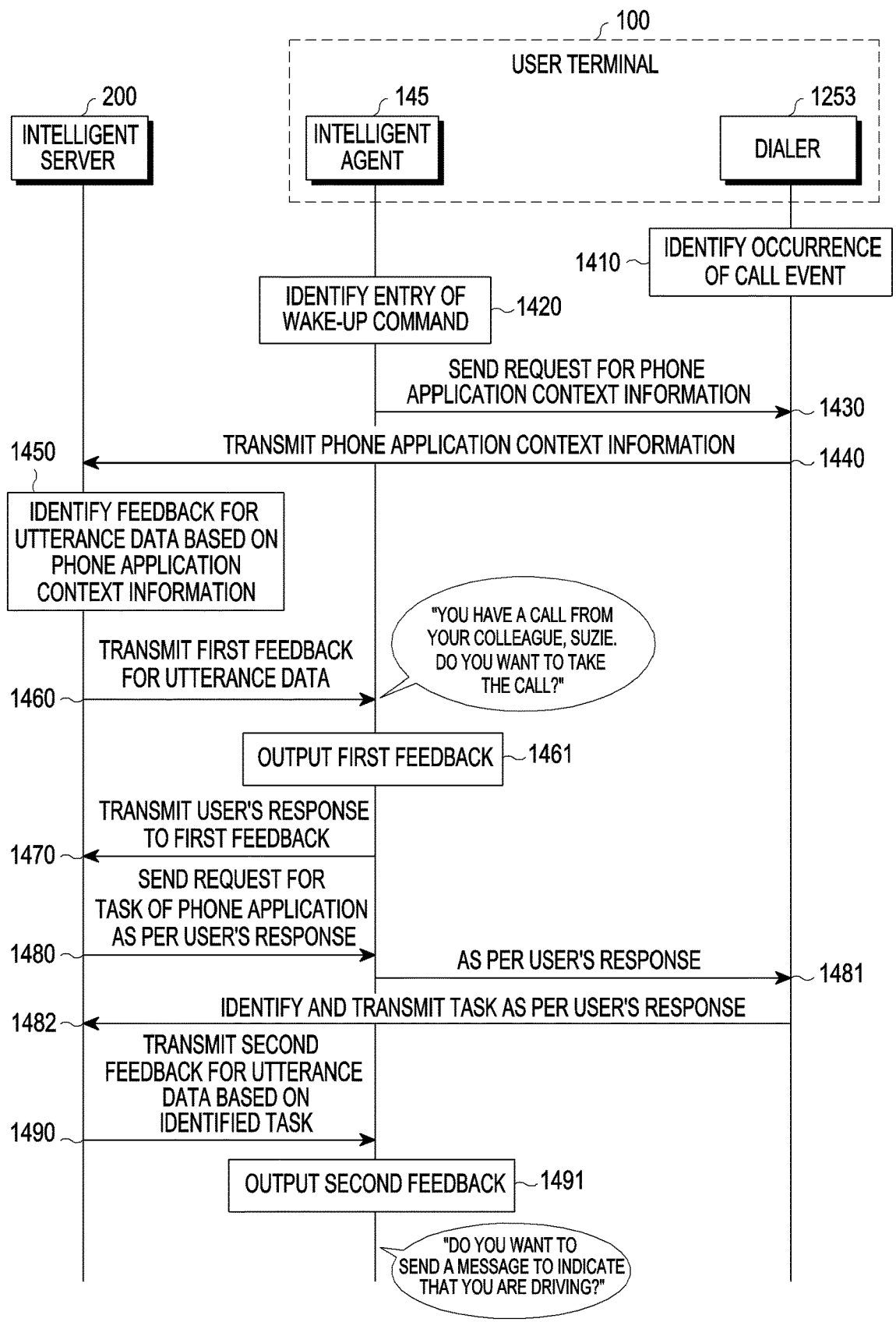
FIG. 14 is a flowchart illustrating an example operation between a server and an electronic device in an intelligence system according to an embodiment of the disclosure.

FIG. 14 is a flowchart illustrating an example operation between a server and an electronic device in an intelligence system according to an embodiment of the disclosure.

Referring to FIG. 14, an intelligence system may include an intelligent server 200 and a user terminal 100. The user terminal 100 may include an intelligent agent 145 and a dialer application 1253 (or a 'dialer').

According to an embodiment, the user terminal 100 may identify that a call event occurs through the dialer application in operation 1410.

According to an embodiment, the intelligent agent 145 of the user terminal 100 may identify entry of a wake-up command (e.g., a wake-up utterance) while the call event occurs in operation 1420. For example, the wake-up utterance may be constituted of designated words (e.g., "Bixby!").

According to an embodiment, the intelligent agent 145 may identify that the wake-up utterance is entered by identifying selection of a designated button (e.g., the hardware key 112) of the user terminal 100 or a button of an external electronic device (e.g., a wired or wireless earphone) wired or wirelessly connected with the user terminal 100.

According to an embodiment, the intelligent agent 145 may send a request for context information of the phone application to the dialer 1253 in operation 1430.

According to an embodiment, the dialer 1253 may transmit phone application context information related to the occurring call event to the intelligent agent 145 in operation 1440.

According to an embodiment, the intelligent server 200 may identify a first feedback for utterance based on the transmitted phone application context information in operation 1450 and transmit data of the first feedback for utterance to the intelligent agent 145 in operation 1460. For example, the first feedback may include information about the call event and information inquiring whether to perform an operation subsequent to the event.

According to an embodiment, the intelligent agent 145 may output the feedback in various forms through the input/output device 340 (e.g., a speaker or display) of the user terminal 100 in operation 1461. For example, the feedback may include the content "You have a call from your colleague, Suzie," as the call event-related information and the content "You want to take the call?" as the information inquiring whether to perform the subsequent operation.

According to an embodiment, the intelligent agent 145 may identify the user's response to the first feedback and transmit the user's response to the intelligent server 200 in operation 1470.

According to an embodiment, the intelligent server 200 may send a request for a task of the phone application executable depending on the user's response to the intelligent agent 145 in operation 1480. For example, when a negative user response for the first feedback is entered or no response is received within a designated time, the intelligent server 200 may send a request for a task of the phone application executable on the dialer 1253 as the additional operation to the call event.

According to an embodiment, the intelligent agent 145 may transfer the task request to the dialer 1253 in operation 1481.

According to an embodiment, the dialer 1253 may identify a task according to the user's response and transmit the identified task to the intelligent server 200 in operation 1482.

According to an embodiment, the intelligent server 200 may identify a second feedback for the utterance based on the identified task and transmit it to the intelligent agent 145 in operation 1490. For example, the second feedback may include information inquiring whether to execute the identified task.

According to an embodiment, as the user enters a negative response to the utterance, e.g., not taking the call, for the occurring call event, the intelligent server 200 may identify, as the second feedback, the operation of transmitting a message to notify the caller that the call may not be taken, which corresponds to the subsequent operation of the utterance.

According to an embodiment, the intelligent agent 145 may output the second feedback received from the intelligent server 200 through the input/output device 340 in operation 1491. For example, the second feedback may include the content "Do you want to send Suzie a message to indicate that you are driving?" to inquire whether to send a message to the caller.

According to an embodiment, when an utterance is entered while an event for an application occurs, the user terminal 100 may output, as feedback, information inquiring whether to perform the operation of the application where the event occurs in relation to the utterance. Selectively, the user terminal 100 may receive a user input for the feedback and output information inquiring whether to additionally perform an operation of the application. For example, the user may identify the occurring event on the application through the intelligence system and receive feedback inquiring whether to perform the event-related operation.

Figure 15:
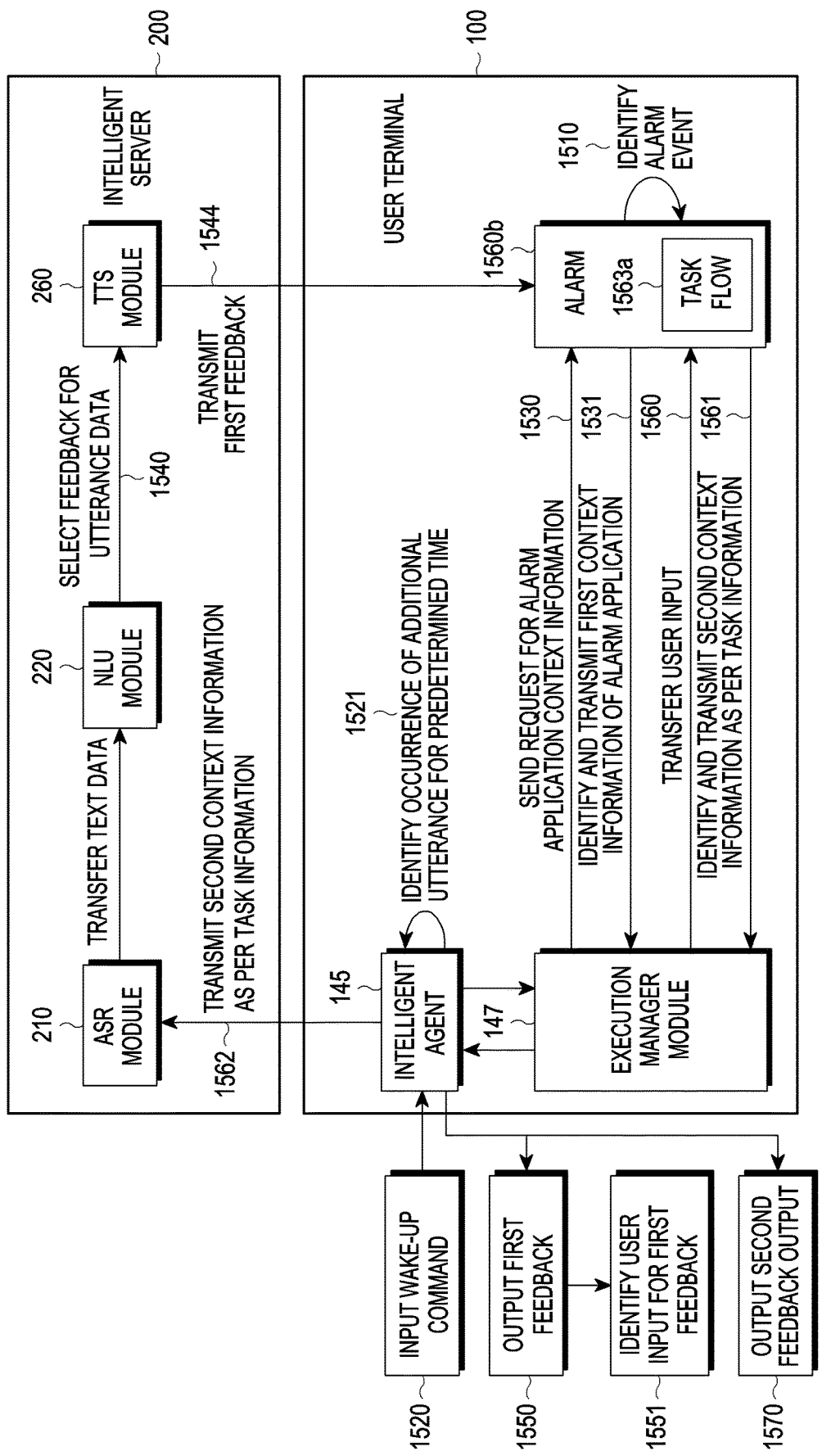
FIG. 15 is a block diagram illustrating example components of an intelligence system and example operations among the components according to an embodiment of the disclosure.

FIG. 15 is a block diagram illustrating example components of an intelligence system and example operations among the components according to an embodiment of the disclosure.

Referring to FIG. 15, an intelligence system may include an intelligent server 200 and a user terminal 100. The intelligent server 200 may include an ASR module 210, an NLU module 220, and a TTS module 260, and the user terminal 100 may include an intelligent agent 145, an execution manager module 147, and an alarm application 1560*b* (or, an 'alarm').

According to an embodiment, the alarm 1560*b* may identify that an alarm event occurs in operation 1510. For example, when the alarm event occurs, the alarm 1560*b* may output information to indicate that the current time has reached a particular date and time or that a designated schedule is coming up in various types of data, e.g., speech, image, or text data.

According to an embodiment, the intelligent agent 145 may identify entry of a wake-up command (or wake-up utterance) from the user while the alarm event occurs in operation 1520. For example, the wake-up utterance may be constituted only of designated words.

According to an embodiment, the intelligent agent 145 may determine whether an additional utterance is entered within a predetermined time after the utterance has been entered in operation 1521. For example, when an additional utterance is entered within the designated time, an operation of an application of the user terminal 100 corresponding to the additional utterance may be performed.

According to an embodiment, upon determining that no additional utterance is entered within the designated time, the intelligent agent 145 may control the execution manager module 147 to send a request for context information of an alarm application to the alarm 1560b in operation 1530.

According to an embodiment, the alarm 1560b may identify the context information of the alarm application and transfer to the execution manager module 147 in operation 1531.

According to an embodiment, the execution manager module 147 may transmit the context information to the intelligent server 200. For example, the NLU module 220 may select a first feedback for the utterance based on the context information in operation 1540 and transmit the selected first feedback to the user terminal 100 through the TTS module 260 in operation 1544.

According to an embodiment, the intelligent agent 145 may output the first feedback for the utterance in operation 1550.

According to an embodiment, the intelligent agent 145 may identify a user input for the first feedback in operation 1551. For example, the intelligent agent 145 may determine whether the user input indicates a positive or negative response to the first feedback or is received within a designated time.

According to an embodiment, the intelligent agent 145 may transfer the user input to the first feedback to the alarm 1560b in operation 1560.

According to an embodiment, the alarm 1560b may identify second context information according to task information as per the user input for the first feedback and transfer it to the intelligent agent 145 in operation 1561. For example, when the user input indicates a negative response or is not received within a designated time, the alarm 1560b may identify second context information based on task flow (1563a) information in the alarm 1560b.

According to an embodiment, in operation 1562, the intelligent agent 145 may transmit the second context information to the ASR module 210 of the intelligent server 200 and reperform operations 1540 and 1544, selecting the second feedback for the utterance based on the second context information through the NLU module 220 and transmitting the selected feedback to the user terminal 100 through the TTS module 260.

According to an embodiment, the task flow 1563a may include information about an operation flow when an event occurs in the alarm 1560b, and information inquiring whether to perform a particular operation of the operation flow may be output as feedback. For example, the alarm 1560b may include a task flow including the operations of going off, turning off, or snoozing an alarm when an alarm event occurs.

According to an embodiment, the intelligent agent 145 may output the second feedback through an input/output device (e.g., the display 120 or speaker 130 of FIG. 2) of the user terminal 100 in operation 1570.

Figure 16:
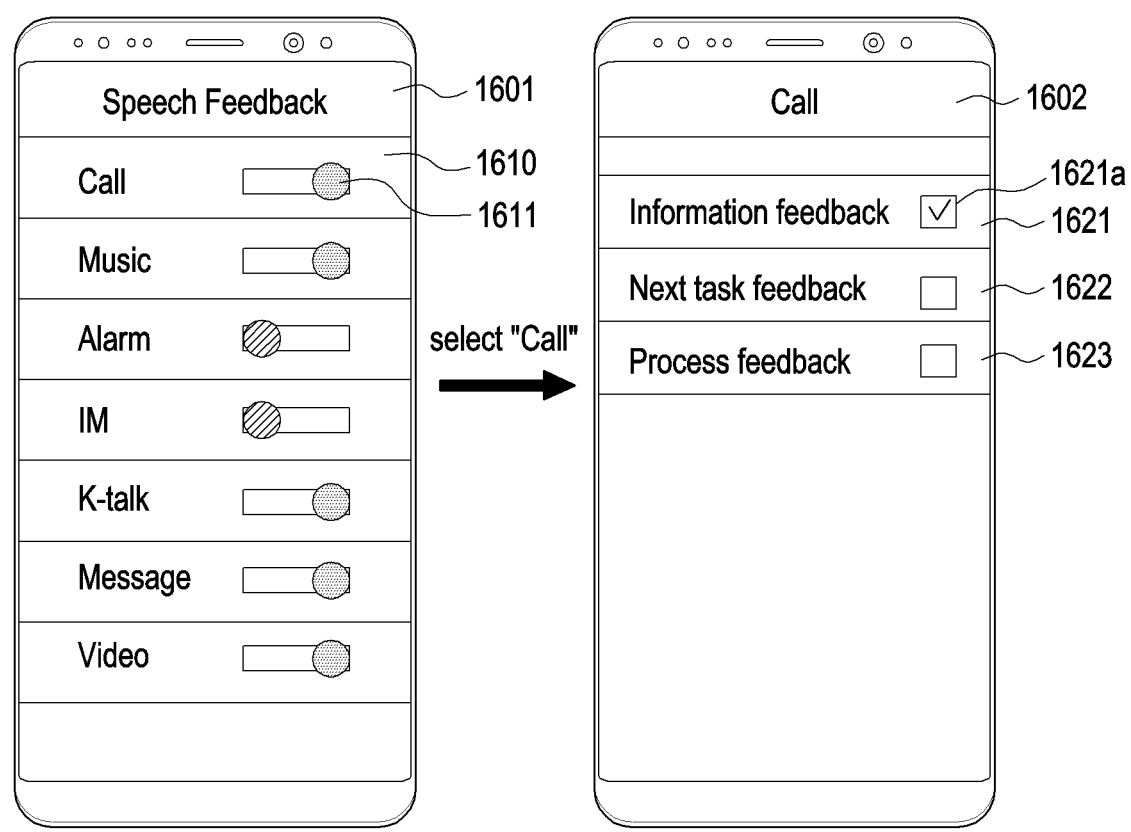
FIG. 16 is a view illustrating an example screen configuration of setting an application to use an intelligent service according to an embodiment of the disclosure.

FIG. 16 is a view illustrating an example screen configuration of setting an application to use an intelligent service according to an embodiment of the disclosure.

Referring to FIG. 16, a user terminal 100 may display a screen 1601 to set up whether to support feedback depending on the execution state in using an intelligent service. The screen 1601 may be displayed when a particular menu item of an application is selected or otherwise when a designated input is received.

According to an embodiment, the screen 1601 may display a list of applications and a function setting button 1611 for each application. The list of applications may include a phone application (call) 1610, a music play application (music), an alarm application (alarm), an instant messaging application (IM or K-talk), a short message service/multimedia messaging service (MMS) application (message), or a video play application (video) or other various applications stored in the user terminal 100.

According to an embodiment, when an input on a button 1611 corresponding to the 'call' 1610 is received, the button 1611 may be moved, e.g., right, and be set to 'on.' In this case, feedback for an entered utterance may be output based on the execution state of the alarm application. For example, when a wake-up utterance is entered while a call event occurs in the phone application, feedback for the entered utterance may be output including the caller information included in the call event or information inquiring whether to perform a subsequent operation (e.g., call reception).

According to an embodiment, when the 'call' 1610 item of the application list is selected, the screen 1601 may switch into a screen 1602 to select a detailed feedback type of 'call.' For example, the screen 1602 may include a selection item (e.g., 1621a) to select feedback to be output and the type of feedback.

According to an embodiment, types of feedback may include a first feedback (information feedback) 1621 (e.g., "You have a call.") including information about the event, a second feedback (next or subsequent task feedback) 1622 (e.g., "Do you want to take the call?") including information about a task performable as an operation subsequent to the event, or a third feedback (progress feedback) 1623 (e.g., "Phone has rung three times.") including information related to the progress of the event For example, when the user selects the selection item 1621a for the first feedback 1621, and an utterance is entered while a call event occurs in the phone application, feedback containing information about the call event may be output as feedback for the utterance.

Figure 17A:
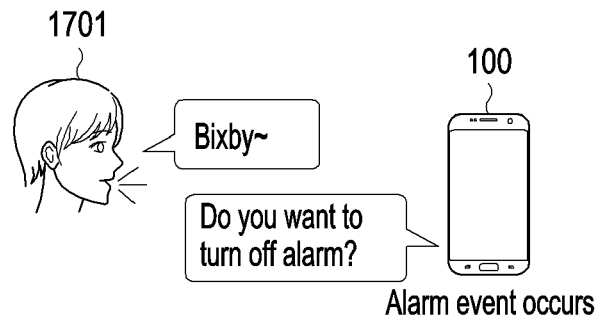
FIGS. 17A, 17B, and 17C are views illustrating various example scenarios of outputting feedback by an electronic device according to entry of a user's utterance in an intelligence system according to an embodiment of the disclosure.
Figure 17B:
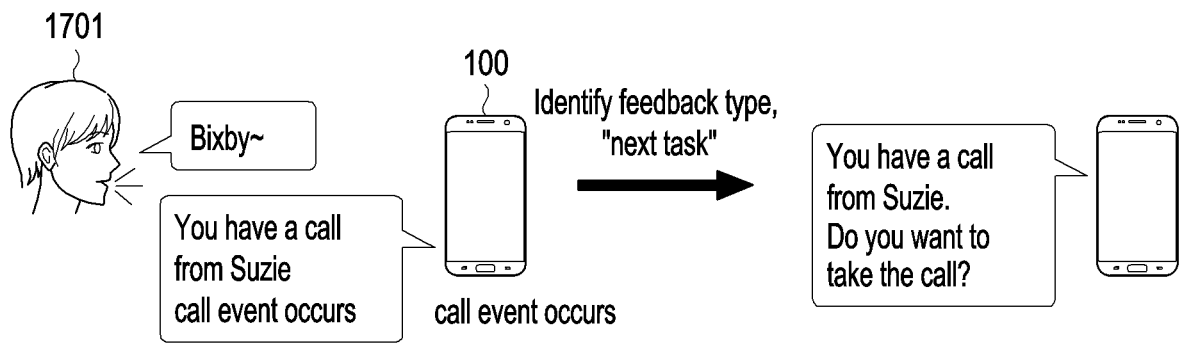
Figure 17C:
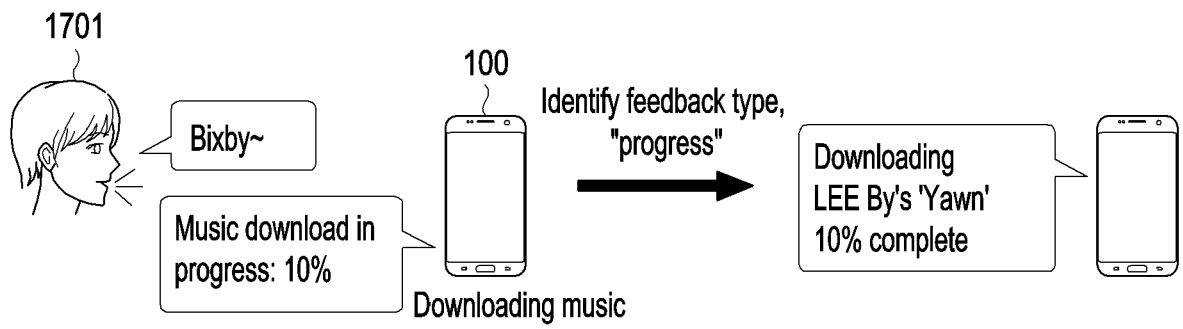

FIGS. 17A, 17B, and 17C are views illustrating various example scenarios of outputting feedback by an electronic device according to entry of a user's utterance in an intelligence system according to an embodiment of the disclosure.

Referring to FIG. 17A, an alarm event may be occurring from an alarm application (e.g., the alarm 1560b) in a user terminal 100. The user 1301 may enter a wake-up utterance (e.g., "Bixby!") to the user terminal 100 while the alarm event occurs.

According to an embodiment, when there is no additional utterance within a designated time after the utterance has been entered, the user terminal 100 may identify context information (app context info.) of the alarm application where the event occurs. The context information of the alarm application may include a current task, a subsequent task, or feedback type (speech feedback type). For example, the user terminal 100 may identify the current task as alarm ringing, the subsequent task as an alarm end task as an operation performable as an operation subsequent to the current task, and the feedback type as feedback including information inquiring whether to perform the 'next task' as the subsequent task is identified.

According to an embodiment, the user terminal 100 may output feedback for the utterance depending on the feedback type. For example, the user terminal 100 may output the feedback including information (e.g., "Do you want to turn off the alarm?") inquiring whether to end the alarm as the task subsequent to the alarm ringing operation which is the current task.

According to an embodiment, the user may activate the intelligence system using a brief word and not only identify the operation subsequent to the currently occurring event but also determine whether to perform.

Referring to FIG. 17B, a call event may occur from a phone application (e.g., the dialer 1253) in the user terminal 100. The user 1701 may enter a wake-up utterance (e.g., "Bixby!") to the user terminal 100 while the call event occurs.

According to an embodiment, when there is no additional utterance within a designated time after the utterance has been entered, the user terminal 100 may identify context information of the phone application where the event occurs. The current task of the phone application may be identified as call receiving (call ringing), and the feedback type may be identified as feedback including information about the current task.

According to an embodiment, the user terminal 100 may output information about the current task executed on the phone application as feedback for the utterance depending on the feedback type. For example, the user terminal 100 may output, as the feedback for the utterance, feedback including the content "You have a call from Suzie."

According to an embodiment, the user terminal 100 may additionally identify a task subsequent to the current task or output feedback including information inquiring whether to perform the subsequent task and the information about the current task depending on the feedback settings for the phone application. For example, as the user terminal 100 identifies the operation of taking the received call as the subsequent task to the current task of call receiving, the feedback for the utterance may include the content "You have a call from Suzie. Do you want to take the call?"

According to an embodiment, the user may activate the intelligence system using a brief word and receive, as feedback, information about the currently occurring event and information inquiring whether to perform the subsequent operation.

Referring to FIG. 17C, a music download event may occur from a music play application (e.g., the media player 382) in the user terminal 100. The user 1701 may enter a wake-up utterance (e.g., "Bixby!") to the user terminal 100 while the music download event occurs.

According to an embodiment, when there is no additional utterance within a designated time after the utterance has been entered, the user terminal 100 may identify context information of the music play application where the event occurs. For example, by identifying music downloading as the current task of the music play application, the user terminal 100 may identify the feedback type as outputting progress indicating information.

According to an embodiment, the user terminal 100 may output, as feedback for the utterance, information about the music downloading task executed on the music play application. For example, the user terminal 100 may output feedback containing the content "music downloading 10% complete" as the feedback for the utterance.

According to an embodiment, as the user terminal 100 identifies information (e.g., musician or song title) about the content where an event occurs, the user terminal 100 may output, as feedback, information about the content, along with information indicating the progress of the current task. For example, the feedback for the utterance may include the content "Song by musician (e.g., TEE, Bye') titled (Yawn) is downloading. 10% complete."

According to an embodiment, the user may activate the intelligence system using a brief word and receive, as feedback, information about the currently occurring event and the progress.

Figure 18:
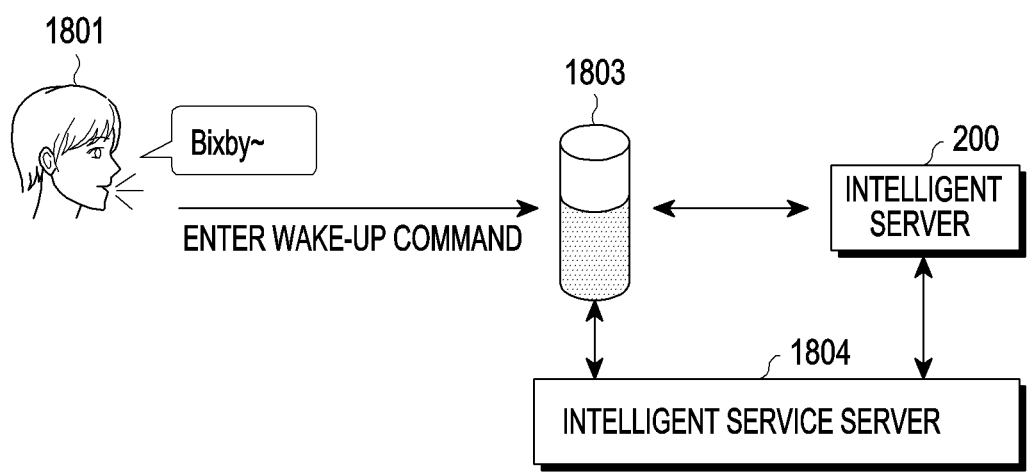
FIG. 18 is a view illustrating an example scenario of outputting feedback from a smart speaker according to entry of a user's utterance in an intelligence system according to an embodiment of the disclosure.

FIG. 18 is a view illustrating an example scenario of outputting feedback from a smart speaker according to entry of an utterance in an intelligence system according to an embodiment of the disclosure.

Referring to FIG. 18, an intelligence system may include a smart speaker (or AI speaker) 1803, an intelligent service server 1804, or an intelligent server 200.

According to an embodiment, a user 1801 may enter a wake-up utterance to the smart speaker 1803. For example, the smart speaker 1803 may be a device connected with the intelligent server 200 to output feedback for an utterance received in the form of a speech.

According to an embodiment, an intelligent agent (e.g., the intelligent agent 145) of the smart speaker 1803 may identify that the wake-up utterance has been entered as it identifies selection of a designated button (e.g., the hardware key 112) of the smart speaker 1803.

According to an embodiment, the smart speaker 1803 may transfer the received utterance to the intelligent service server 1804 that supports an AI service platform for providing services through the smart speaker 1803. For example, the intelligent service server 1804 may identify whether a subsequent utterance comes in within a designated time.

According to an embodiment, although the smart speaker 1803 has been described to transfer the received utterance to the intelligent service server 1804, the intelligent service server 1804 may be omitted or, when not connected with the smart speaker 1803, the utterance may be transferred to the intelligent server 200.

According to an embodiment, when no utterance subsequent to the received utterance is identified, the intelligent server 200 or the intelligent service server 1804 may identify feedback based on the service being currently executed on the smart speaker 1803 and the feedback may be transferred to the smart speaker 1803.

According to an embodiment, when the user 1801 issues an utterance, saying "Order a kitchen towel," along with a wake-up utterance (e.g., "Bixby~"), the intelligent server 200 or the intelligent service server 1804 may interpret the utterance of the user 1801 and perform an operation for ordering a 'kitchen towel.' For example, the intelligent server 200 or the intelligent service server 1804 may transfer a result of performing the operation to the smart speaker 1803 so that the result may be outputted through the smart speaker 1803 in the form of a speech.

According to an embodiment, when no feedback for the received utterance is output, such as when communication between the intelligent server 200 or the intelligent service server 1804 and the smart speaker 1803 is delayed, the user 1801 may reenter a wake-up utterance. For example, the intelligent server 200 or the intelligent service server 1804 may transfer feedback for the reentered wake-up utterance including information about the received utterance to the smart speaker 1803. For example, the feedback for the reentered wake-up utterance may include information about the progress (e.g., "A search is now in progress.") or information about a subsequent task (e.g., "Do you want to stop searching?") for the received utterance.

According to an embodiment, the user 1801 may play music as a streaming service through the smart speaker 1803. For example, when the user 1801 enters a wake-up utterance during a streaming service, the intelligent server 200 or the intelligent service server 1804 may identify information related to the streaming service as feedback for the wake-up utterance.

According to an embodiment, when the smart speaker 1803 temporarily drops out while playing music or connection with the server providing the streaming service is unstable, the user 1801 may enter a wake-up utterance (e.g., "Bixby~") to the smart speaker 1803. For example, the intelligent server 200 or the intelligent service server 1804 may identify information related to the streaming service being executed on the smart speaker 1803 as feedback for the wake-up utterance. The streaming service-related information may include at least part of connection state information of the streaming service (e.g., "Music downloading is currently delayed due to network latency."), subsequent task information (e.g., "Do you want to play the downloaded music?" or "Do you want to play music via another music streaming service?"), or the state of the streaming service (e.g., "Slow response from the server (e.g., intelligent service server 1804)").

According to an embodiment, while playing a song on the streaming service, the user 1801 may enter an utterance (e.g., "Save (or purchase) the song now in play.") to store the song in the memory of the smart speaker 1803 or purchase the song, along with a wake-up utterance (e.g., "Bixby~"), to the smart speaker 1803. For example, while a certain song is being downloaded based on the utterance, the user may enter a wake-up utterance to identify the state of the download. For example, the smart speaker 1803 may output download state information (e.g., "Currently 30% downloaded. The remaining time is 3 seconds.") as feedback for the wake-up utterance.

According to an embodiment, when the user enters a wake-up utterance through various electronic devices connected with the intelligent server 200, feedback containing operation state information or subsequent task information may be output based on a function executed on a corresponding electronic device.

Figure 19:
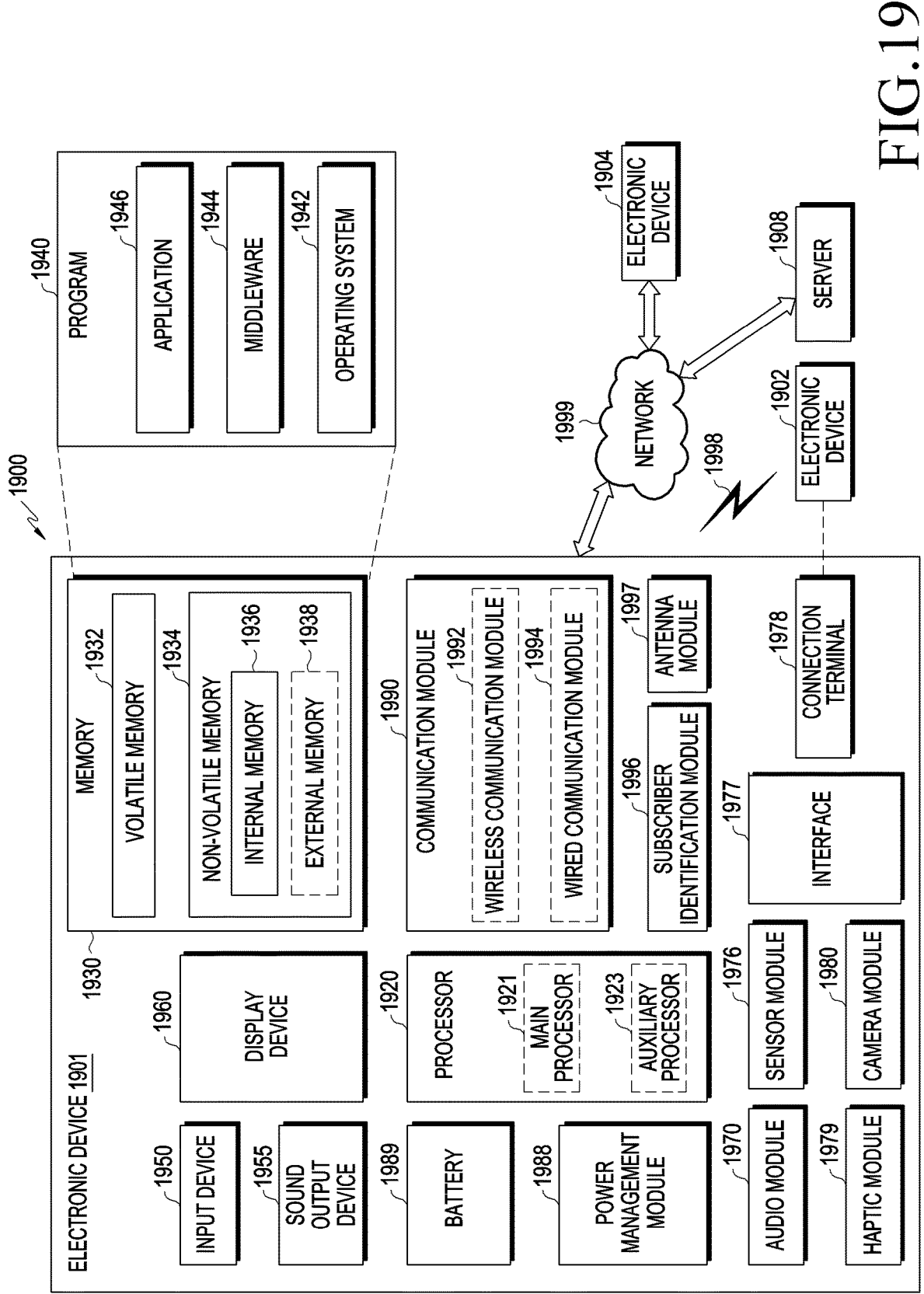
FIG. 19 is a block diagram illustrating an electronic device in a network environment according to an embodiment of the disclosure.

FIG. 19 is a block diagram illustrating an electronic device 1901 (or a first electronic device) in a network environment 1900 according to various embodiments of the disclosure.

Referring to FIG. 19, the electronic device 1901 (e.g., the user terminal 100 of FIG. 1) in the network environment 1900 may communicate with an electronic device 1902 (or a second electronic device) via a first network 1998 (e.g., a short-range wireless communication network), or an electronic device 1904 or a server 1908 (e.g., the intelligent server 200 of FIG. 1) via a second network 1999 (e.g., a long-range wireless communication network). According to an embodiment, the electronic device 1901 may communicate with the electronic device 1904 via the server 1908. According to an embodiment, the electronic device 1901 may include a processor 1920 (e.g., the processor 150 FIG. 2), memory 1930 (e.g., the memory 140 of FIG. 2), an input device 1950, a sound output device 1955 (e.g., the speaker 130 of FIG. 2), a display device 1960 (e.g., the display 120 of FIG. 2), an audio module 1970, a sensor module 1976, an interface 1977, a haptic module 1979, a camera module 1980, a power management module 1988, a battery 1989, a communication module 1990, a subscriber identification module (SIM) 1996, or an antenna module 1997. In some embodiments, at least one (e.g., the display device 1960 or the camera module 1980) of the components may be omitted from the electronic device 1901, or one or more other components may be added in the electronic device 101. In some embodiments, some of the components may be implemented as single integrated circuitry. For example, the sensor module 1976 (e.g., a fingerprint sensor, an iris sensor, or an illuminance sensor) may be implemented as embedded in the display device 1960 (e.g., a display).

The processor 1920 may execute, for example, software (e.g., a program 1940) to control at least one other component (e.g., a hardware or software component) of the electronic device 1901 coupled with the processor 1920, and may perform various data processing or computation. According to one embodiment, as at least part of the data processing or computation, the processor 1920 may load a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., a CPU or an AP), and an auxiliary processor 1923 (e.g., a graphics processing unit (GPU), an image signal processor (ISP), a sensor hub processor, or a communication processor (CP)) that is operable independently from, or in conjunction with, the main processor 1921. Additionally or alternatively, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an ISP or a CP) may be implemented as part of another component (e.g., the camera module 1980 or the communication module 1990) functionally related to the auxiliary processor 1923.

The memory 1940 may store various data used by at least one component (e.g., the processor 1920 or the sensor module 1976) of the electronic device 1901. The various data may include, for example, software (e.g., the program 1940) and input data or output data for a command related thereto. The memory 1940 may include the volatile memory 1932 or the non-volatile memory 1934.

The program 1940 may be stored in the memory 1930 as software, and may include, for example, an OS 1942, middleware 1944, or an application 1946.

The input device 1950 may receive a command or data to be used by another component (e.g., the processor 1920) of the electronic device 1901, from the outside (e.g., a user) of the electronic device 1901. The input device 1950 may include, for example, a microphone, a mouse, or a keyboard.

The sound output device 1955 may output sound signals to the outside of the electronic device 1901. The sound output device 1955 may include, for example, a speaker or a receiver. The speaker may be used for general purposes, such as playing multimedia or playing records, and the receiver may be used for an incoming call. According to an embodiment, the receiver may be implemented as separate from, or as part of the speaker.

The display device 1960 may visually provide information to the outside (e.g., a user) of the electronic device 1901. The display device 1960 may include, for example, a display, a hologram device, or a projector and control circuitry to control a corresponding one of the display, hologram device, and projector. According to an embodiment, the display device 1960 may include touch circuitry adapted to detect a touch, or sensor circuitry (e.g., a pressure sensor) adapted to measure the intensity of force incurred by the touch.

The audio module 1970 may convert a sound into an electrical signal and vice versa. According to an embodiment, the audio module 1970 may obtain the sound via the input device 1950, or output the sound via the sound output device 1955 or a headphone of an external electronic device (e.g., an electronic device 1902) directly (e.g., wired) or wirelessly coupled with the electronic device 1901.

The sensor module 1976 may detect an operational state (e.g., power or temperature) of the electronic device 1901 or an environmental state (e.g., a state of a user) external to the electronic device 101, and then generate an electrical signal or data value corresponding to the detected state. According to an embodiment, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the electronic device 1902) directly (e.g., wired) or wirelessly. According to an embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the electronic device 1902). According to an embodiment, the connecting terminal 1978 may include, for example, a HDMI connector, a USB connector, a SD card connector, or an audio connector (e.g., a headphone connector).

The haptic module 1979 may convert an electrical signal into a mechanical stimulus (e.g., a vibration or motion) or electrical stimulus which may be recognized by a user via his tactile sensation or kinesthetic sensation. According to an embodiment, the haptic module 1979 may include, for example, a motor, a piezoelectric element, or an electric stimulator.

The camera module 1980 may capture a still image or moving images. According to an embodiment, the camera module 1980 may include one or more lenses, image sensors, ISPs, or flashes.

The power management module 1988 may manage power supplied to the electronic device 1901. According to one embodiment, the power management module 188 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more CPs that are operable independently from the processor 1920 (e.g., the AP) and supports a direct (e.g., wired) communication or a wireless communication. According to an embodiment, the communication module 1990 may include a wireless communication module 1992 (e.g., a cellular communication module, a short-range wireless communication module, or a GNSS communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, Wi-Fi direct, or infrared data association (IrDA)) or the second network 1999 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the SIM 1996.

The antenna module 1997 may transmit or receive a signal or power to or from the outside (e.g., the external electronic device) of the electronic device 101. According to an embodiment, the antenna module 1997 may include one or more antennas, and, therefrom, at least one antenna appropriate for a communication scheme used in the communication network, such as the first network 1998 or the second network 1999, may be selected, for example, by the communication module 1990 (e.g., the wireless communication module 192). The signal or the power may then be transmitted or received between the communication module 1990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the electronic devices 1902 and 104 may be a device of a same type as, or a different type, from the electronic device 1901.

According to an embodiment, all or some of operations to be executed by the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 1940) containing commands that are stored in a machine (e.g., computer)-readable storage medium (e.g., an internal memory 1936) or an external memory 1938. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 150), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semi-permanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the forgoing description, according to various embodiments, an electronic device and a method of executing a function of an electronic device may identify the state of an application being executed by entering a designated utterance although the electronic device is a predetermined distance away from the user or is operated in a hold mode so that the user cannot identify the current state of the electronic device.

According to various embodiments, an electronic device and a method of executing a function of an electronic device may identify not only a task of an application being executed but also whether to perform another task executable in connection with the current task and allow the user to control an application to operate even without an additional utterance to operate the application.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device, comprising:
a communication circuit;
a microphone;
at least one processor; and
a memory operatively connected with the at least one processor,
wherein the memory stores instructions configured, when executed, to enable the at least one processor to:
perform a first operation,
receive an utterance through the microphone while the first operation is being performed, and in response to the received utterance corresponding to a wake-up word used to invoke a speech-based intelligent service, and in response to an additional utterance being not received within a designated time after the received utterance, identify information related to the first operation being performed, and output the identified information through a speaker in response to receiving the utterance.

2. The electronic device of claim 1, wherein the instructions are further configured to enable the at least one processor to determine the information by using a server.

3. The electronic device of claim 2, wherein the instructions are further configured to enable the at least one processor to:
perform the first operation, after receiving the utterance, transmit data related to the first operation to the server,
in response to transmitting the data, receive a response from the server, and
output an aural response based on the response.

4. The electronic device of claim 2, wherein the instructions are further configured to enable the at least one processor to:
transmit data related to the utterance to the server,
request the server to identify the information related to the first operation, and
receive the information from the server.

5. The electronic device of claim 1, wherein the first operation includes at least one of a call event, an alarm event, a timer event, a music playback event, a video playback event, a hands-free event, or a content downloading event.

6. The electronic device of claim 1, wherein the information includes information related to a progress of the first operation or an operation subsequent to the first operation.

7. The electronic device of claim 6, wherein the instructions are further configured to enable the at least one processor to:
determine whether progress information is changed within a designated time after the determining of the information, and
output another information including the progress information.

8. The electronic device of claim 1, wherein the instructions are further configured to enable the at least one processor to:
receive a user input for the output information,
determine a second operation related to the first operation when the received user input corresponds to a designated input, and
further output a second information to determine whether to perform the second operation.

9. The electronic device of claim 1, wherein the instructions are further configured to enable the at least one processor to:
receive a user input for the information, and
when the received user input does not correspond to a designated input, perform at least one function corresponding to the first operation.

10. The electronic device of claim 1, wherein the instructions are further configured to enable the at least one processor to:
determine whether the electronic device is operating in a designated mode, and
after receiving the utterance, transmit data related to the first operation to a server based on a determination that the electronic device is operating in the designated mode.

11. A method of an electronic device, the method comprising:
performing a first operation;
receiving an utterance through a microphone of the electronic device while the first operation is being performed; and
in response to the received utterance corresponding to a wake-up word used to invoke a speech-based intelligent service, and in response to an addition utterance being not received within a designated time after the received utterance, identifying information related to the first operation being performed, and outputting the identified information through a speaker in response to receiving the utterance.

12. The method of claim 11,
wherein the identifying of the information comprises using a server, and
wherein the method further comprises:
transmitting data related to the utterance to the server, and
receiving, from the server, the information.

13. The method of claim 11, wherein the first operation includes at least one of a call event, an alarm event, a timer event, a music playback event, a video playback event, a hands-free event, or a content downloading event.

14. The method of claim 11, wherein the information includes information related to a progress of the first operation or an operation subsequent to the first operation.

15. The method of claim 14, further comprising:
determining whether progress information is changed within a designated time after the determining of the information; and
outputting another information including the progress information.

16. The method of claim 11, further comprising:
receiving a user input for the output information;
determining a second operation related to the first operation when the user input corresponds to a designated input; and
outputting a second information to determine whether to perform the second operation.

17. The method of claim 11, further comprising:
receiving a user input for the information; and
when the user input does not correspond to a designated input, performing at least one function corresponding to the first operation.

18. The method of claim 11, further comprising:
determining whether the electronic device is operating in a designated mode; and
after receiving the utterance, transmitting data related to the first operation to a server based on a determination that the electronic device is operating in the designated mode.

* * * * *